(12) United States Patent
Jung et al.

(10) Patent No.: US 12,246,734 B1
(45) Date of Patent: Mar. 11, 2025

(54) VEHICLE CONSTRAINT GENERATION

(71) Applicant: Zoox, Inc., Foster City, CA (US)

(72) Inventors: Timothy Henry Jung, Seattle, WA (US); Janakan Chandrakumar, San Carlos, CA (US); Collin MacGregor, Redwood City, CA (US); Joshua Paul Munic, San Mateo, CA (US); Matthew Ambrose Romlewski, San Mateo, CA (US); Aaron Rosekind, San Jose, CA (US); Sandra Ruiz, Newark, CA (US); Nehemia Girma Terefe, Foster City, CA (US); Nathaniel John Villaume, Foster City, CA (US); Darrin Sammons Willis, San Francisco, CA (US); He Yi, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 192 days.

(21) Appl. No.: 18/115,336

(22) Filed: Feb. 28, 2023

(51) Int. Cl.
*B60W 50/02* (2012.01)
*B60W 60/00* (2020.01)

(52) U.S. Cl.
CPC .... *B60W 50/0205* (2013.01); *B60W 60/0015* (2020.02); *B60W 2050/0215* (2013.01); *B60W 2556/10* (2020.02); *B60W 2556/45* (2020.02)

(58) Field of Classification Search
CPC ......... B60W 50/0205; B60W 60/0015; B60W 2556/10; B60W 2556/45; B60W 2050/0215
See application file for complete search history.

(56) References Cited

U.S. PATENT DOCUMENTS

| | | | |
|---|---|---|---|
| 2020/0039528 A1* | 2/2020 | Ewert | G07C 5/008 |
| 2020/0257298 A1* | 8/2020 | Ucar | H04W 4/46 |
| 2021/0078175 A1* | 3/2021 | Liu | G05D 1/0223 |
| 2022/0068253 A1* | 3/2022 | Pignier | G10K 11/17881 |
| 2022/0092231 A1* | 3/2022 | Shen | G06F 30/15 |
| 2022/0212677 A1* | 7/2022 | Zheng | B60T 8/17551 |
| 2022/0276662 A1* | 9/2022 | Ponda | G05D 1/042 |

* cited by examiner

*Primary Examiner* — Hussein Elchanti
(74) *Attorney, Agent, or Firm* — Lee & Hayes, P.C.

(57) ABSTRACT

Techniques are discussed herein for detecting and managing faults occurring within various vehicle systems, to enable the vehicle to respond safely and appropriately to the faults. In examples, a constraint generator may receive sensor data associated with the operation of a vehicle in an environment. The constraint generator may perturb the sensor data to mimic particular sensor faults, and execute simulations to determine performance degradations of the vehicle systems associated with the particular sensor faults. Based on the performance degradations associated with sensor faults, the constraint generator may determine the appropriate constraints with limitations on the operation of the vehicle, and communicate the constraint parameters to the appropriate vehicle systems accordingly.

20 Claims, 10 Drawing Sheets

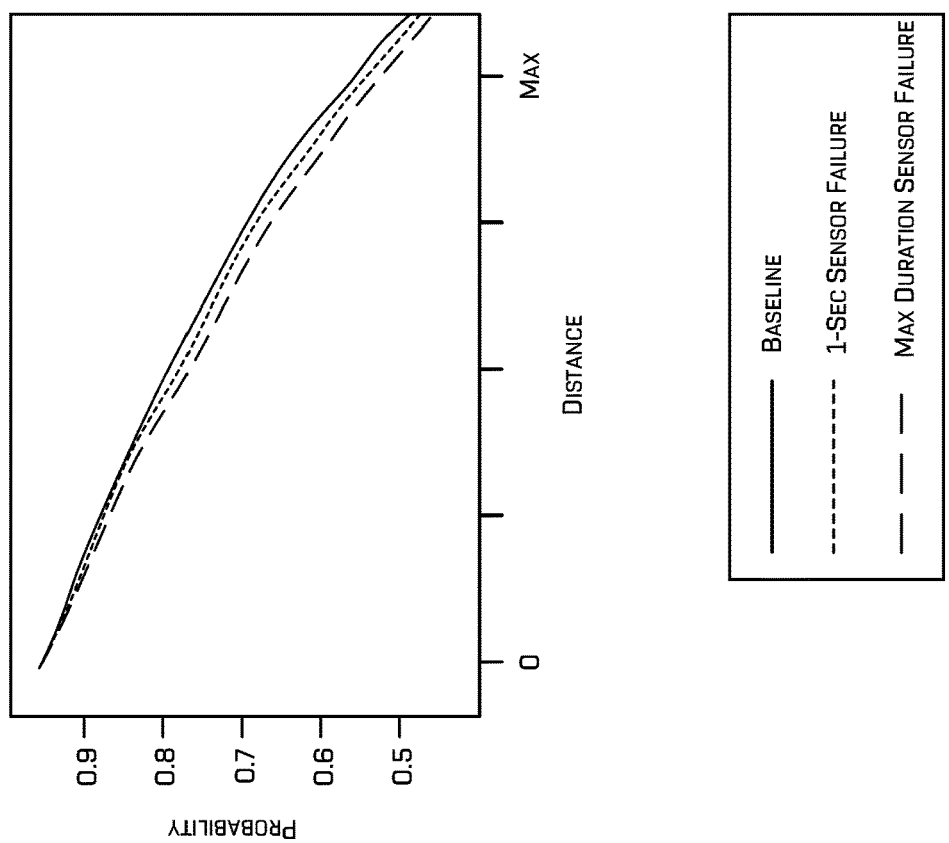
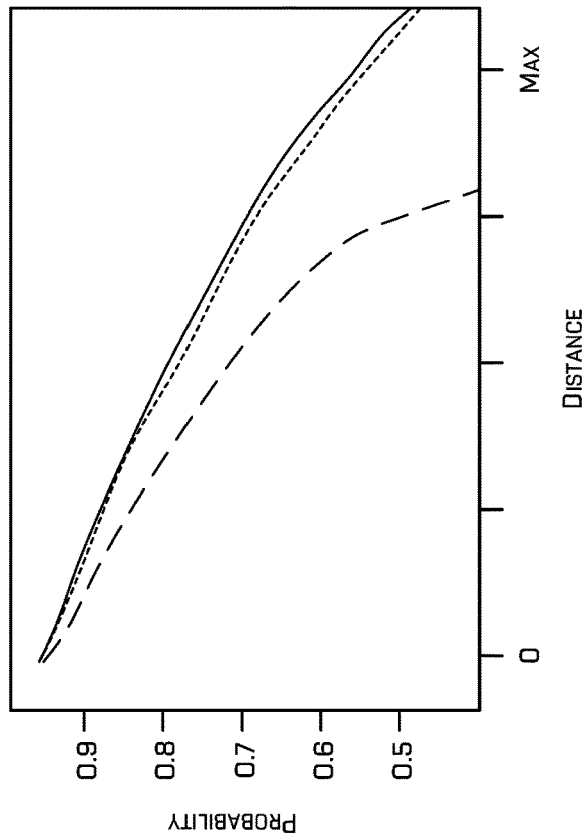
FIG. 6A

Example Constraint Table

| ID | Sensor | Fault Type | Duration | Driving Conditions | Constraint |
|---|---|---|---|---|---|
| ID_01 | Lidar_A4 | Outage | 2 secs | Night Driving | Max Speed = 25 MPH |
| ID_02 | Lidar_A2 | 50% Degradation | -- | Rain, Fog, or Snow | Third Contingent Trajectory |
|  | Radar_A2 | Outage |  |  |  |
| ID_03 | Front Camera | 25% Occlusion | 1 sec | -- | Max Steering Angle = 15% |
| ID_04 | Tire Sensors (Any) | Pressure < 80% | 60 sec | -- | No New Missions |
| ID_05 | Tire Sensors (Any) | Pressure < 50% | 10 sec | -- | Second Contingent Trajectory |

702 → (ID_01 row)
704 → (ID_02 row)
706 → (ID_03 row)
708 → (ID_04 row)
710 → (ID_05 row)

VEHICLE CONSTRAINT GENERATION

BACKGROUND

Autonomous driving may benefit from computing systems capable of guiding such vehicles through environments including any number of static and dynamic objects. For instance, autonomous vehicles may include components configured to perform object detection, segmentation, and/or classification, predict object trajectories, and plan and execute routes to guide the autonomous vehicles safety and efficiently through congested areas with other moving vehicles (autonomous or otherwise), pedestrians, stationary objects, etc. A variety of systems configured to capture and process sensor data associated with the vehicle and/or with the environment may contribute to assist the vehicle with navigating the environment. Occasionally, one or more of these systems may experience a fault (e.g., outage or error), which can affect how the autonomous vehicle perceives other objects and/or traverses the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 6A and 6B illustrate examples of evaluating performance degradations associated with sensor faults, in accordance with one or more examples of the disclosure.

FIG. 7 illustrates an example table including constraints and associated sensor faults and conditions, in accordance with one or more examples of the disclosure.

DETAILED DESCRIPTION

Figure 1:
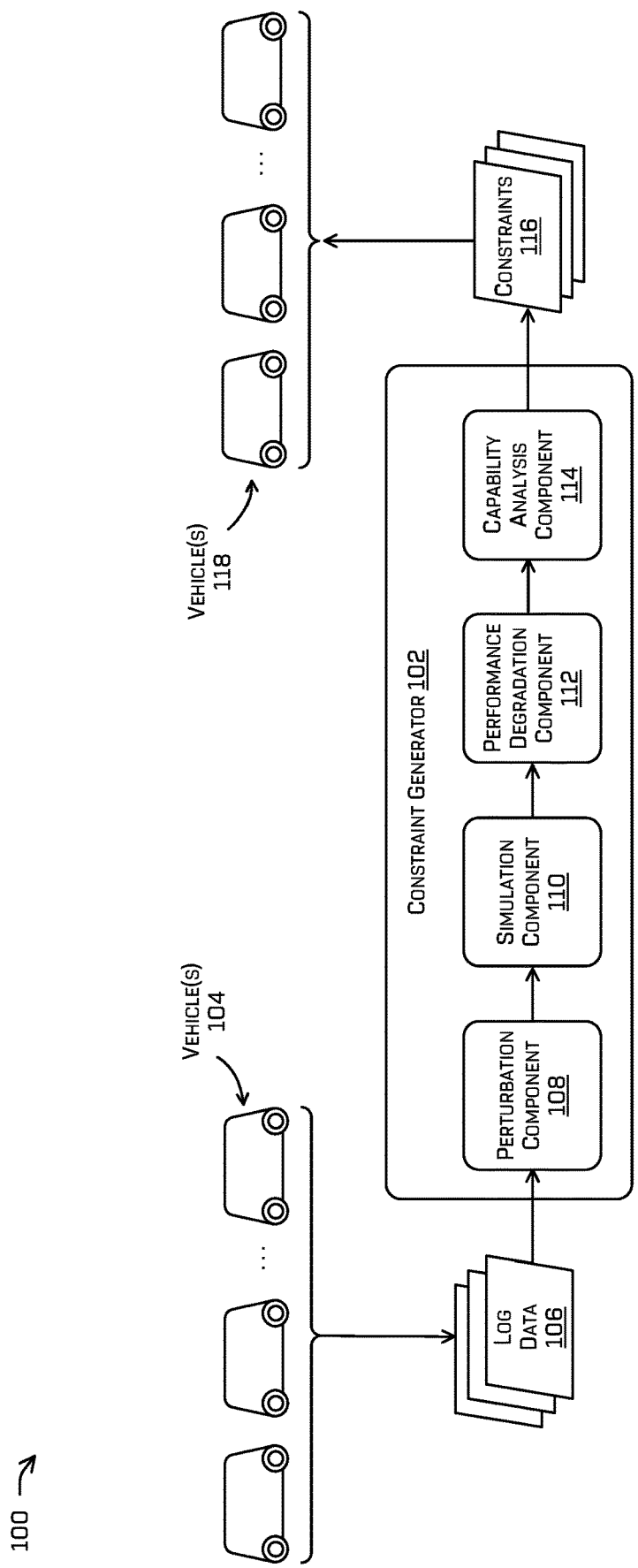
FIG. 1 is a block diagram illustrating an example system including a constraint generator component configured to determine constraints based on performance degradations associated with sensor faults, in accordance with one or more examples of the disclosure.

This application relates to analyzing the performance degradations of vehicle systems associated with various sensor faults, and determining corresponding constraints to enable the vehicle to respond safely and appropriately to the various faults. A constraint generator may receive sensor data (e.g., vehicle log data) associated with the operation of one or more vehicles in driving environments. The constraint generator may perturb the sensor data to mimic various sensor faults, such as sensor outages and errors, and/or other vehicle system faults, and may execute simulations to determine performance degradation metrics for the vehicle associated with the various sensor faults. Based on the performance degradations, the constraint generator may determine appropriate constraints associated with different sensor faults. The constraints, which may include various limitations on the operations of the vehicle, may be transmitted from the constraint generator to any number of vehicles, and the vehicles may use the constraints and associated conditions to control the vehicle operations when corresponding sensor faults occur in driving environments.

Accordingly, the described techniques relate to monitoring and detecting faults during operation of a vehicle, and determining constraints to be applied to the vehicle based on the faults. As used herein, a fault may correspond to an error associated with a vehicle system and/or a signal associated with such an error. For instance, faults may include indications that a functionality of a vehicle system that is not working properly. Additionally or alternatively, faults may be detected based on anomalies in the signal data associated with the vehicle system, such as data outages and/or erroneous data indicating an error or malfunction of the vehicle system. Faults occurring with certain vehicle systems can result in further errors in downstream systems on the vehicles. For example, sensor faults caused by errors or outages of one or more sensors on the vehicle (e.g., lidar sensors, radar sensors, cameras, etc.), can cause additional errors in the downstream components and/or models of the vehicle that rely on the sensor data, including localization components, object detection and tracking components, trajectory prediction components, route planning components, etc.

Certain vehicles include fault monitor systems configured to detect faults occurring on the vehicle and to respond by applying corresponding constraints on the operation of the vehicle. A fault monitor system may initiate different constraints in response to different faults, including various limitations on the vehicle systems and/or instructions that direct the vehicle to operate in a certain way. As an example, a fault monitor system may receive an indication of a critical vehicle fault, and apply a corresponding constraint that instructs the vehicle to pull over immediately. As another example, the fault monitor system may receive an indication of a less critical fault, and apply a constraint instructing the vehicle to find a safe place to park within two minutes. Additional examples and various techniques for using fault monitor systems on vehicles can be found, for example, in U.S. patent application Ser. No. 16/539,893, filed on Aug. 13, 2019, and titled, "Modifying Limits on Vehicle Dynamics for Trajectories," and in U.S. patent application Ser. No. 16/717,913, filed on Dec. 17, 2019, and titled, "Fault Coordination and Management," both of which are incorporated by reference herein in their entirety for all purposes.

However, certain fault monitor systems can cause the vehicle to perform poorly with respect to passenger safety and driving efficiency. For instance, certain fault monitor systems use ad hoc mappings between faults and constraints determined by engineers or designers. Such ad hoc mappings may apply constraints that are overly cautious in some cases, and in other cases may fail to recognize more serious risks. For instance, an ad hoc fault-constraint mapping may cause the fault monitor system to immediately pull the vehicle over in response to a relatively minor sensor fault. In this example, if the sensor fault is a short-term error or outage (e.g., <1 sec), a minor error in data sensitivity, and/or if the failing sensor is redundant based on other sensors on the vehicle, then it might not be necessary for the vehicle to pull over immediately (or to make any change in its mission at all). In other cases, even a seemingly minor sensor fault that persists for a long enough time interval, and/or when combined with other sensor faults or particular driving conditions, may pose a significant risk to the vehicle or the safety of the passengers. In such cases, ad hoc fault-constraint mapping rules may cause the vehicle to proceed as normal or to make minimal adjustments, when a more urgent or restrictive constraint should be applied.

To address these technical challenges, and to improve vehicle safety and efficiency when responding to sensor faults, the techniques described herein include determining performance degradations of vehicle systems caused by various sensor faults, and determining corresponding constraints for the vehicle to apply in response to such faults. As described in the various examples herein, a constraint generator component (or constraint generator) may receive sensor data associated with one or more vehicles. In some cases, the sensor data may be received as vehicle log data, captured by vehicles having multiple sensors of various different sensor modalities (e.g., lidar, radar, image, time-of-flight, depth, etc.) while traversing a driving environment. The constraint generator may perturb portions of the sensor data corresponding to a particular sensor, while leaving sensor data for other sensors unperturbed, in order to represent (or mimic) a sensor fault affecting the particular sensor. Such perturbations can include removing a portion of the sensor data (e.g., to represent a sensor outage) and/or modifying the portions of the sensor data (e.g., to represent an error or malfunction of the sensor). In additional or alternative examples, such sensor data may be generated in simulation. The constraint generator may perturb the entire sensor data associated with a sensor, or may perturb discrete time intervals within the sensor data to represent short-term or intermittent sensor faults. Although certain examples herein describe perturbing sensor data for a single sensor only, in any of the examples described herein, the constraint generator may perturb data associated with multiple sensors to mimic combinations of sensor faults occurring concurrently on the vehicle.

Additionally, although certain examples herein describe perturbing sensor data to mimic sensor faults (and determining constraints associated with the sensor faults), in other examples, the log data and/or driving simulation may be perturbed to mimic other types of vehicle faults, including faults associated with various non-sensor vehicle components. Any other vehicle components may cause faults that manifest within vehicle log data, such as the vehicle braking systems, steering systems, propulsion systems, wheel encoders, tire pressure monitoring system, inertial measurement units (IMUs), etc. For any of the faults described herein (e.g., faults associated with sensors and/or other vehicle components), such faults can be indicated in the log data directly (e.g., via error messages, status data, warnings or exceptions, etc.) and/or may manifest in the log data indirectly (e.g., via the absence of expected data, data anomalies, failures or errors from associated downstream components, etc.). Further, as described below in more detail, certain faults may not manifest in the log data at all, and the constraint generator may instead mimic these faults by using different kinematic models for the simulated vehicle during simulation. The techniques described herein, including perturbing data to mimic faults from sensors and/or other components, and then determining associated constraints to be applied when such faults are detected, can be performed for faults for any of the various vehicle components and/or any of the various types of faults described herein.

After perturbing the sensor data (and/or other log data) to represent faults affecting one or more sensors (and/or other components) on the vehicle, the constraint generator may execute driving simulations using the perturbed data. The constraint generator may evaluate the simulations, relative to the baseline performance levels of the vehicle, to determine the performance degradations (if any) caused by the perturbation of the sensor data. In some examples, the constraint generator may perform a number of simulations using the normal (unperturbed) data, and may compare the results to additional simulations performed using the perturbed data representing the particular sensor fault. Simulations may be evaluated based on the performance of the vehicle controllers in performing various autonomous vehicle functionalities, including (but not limited to) perception functionalities (e.g., object detection, segmentation, tracking for various simulated objects—determining discrepancies in number or position/orientation of detected objects), localization functionalities (e.g., determining the position and pose of the simulated vehicle within the environment), prediction functionalities (e.g., predicting trajectories of dynamic objects), and route-planning functionalities (e.g., determining optimal routes and/or contingent routes for the simulated vehicle to traverse the environment), which may be compared based on a total cost associated with the route/trajectory. In some examples, the results of the simulations using perturbed data to mimic a sensor fault may be compared to the results of similar or identical simulations using unperturbed data, to determine the degree of performance degradations caused by the sensor fault in performing the various autonomous vehicle functionalities. For instance, the results of simulations including a sensor fault may be evaluated relative to performance thresholds (e.g., 90% of the baseline performance level, within the noise level of the baseline performance distribution, etc.) for various autonomous vehicle functionalities.

The constraint generator then may use the performance degradations associated with the sensor data perturbations mimicking sensor faults, to determine appropriate constraints to apply on the vehicle in response to the sensor faults. Three simplified examples are described below of determining constraints for sensor faults, based on the performance degradations caused by the sensor faults, and additional examples of determining appropriate constraints are described elsewhere herein. As a first example, when determining that a first sensor fault causes no performance degradations (or only negligible degradations) in the object detection capabilities of the vehicle, the constraint generator may determine a corresponding constraint that does not affect current operations of the vehicle, such as a constraint requiring the vehicle to return for maintenance after completing its current driving trip or mission. As a second example, when determining that a second sensor fault causes a non-negligible degradation in the capabilities of the vehicle to detect pedestrians at longer ranges (e.g., greater than 30 meters), then the constraint generator may determine a corresponding constraint that includes a speed restriction but allows the vehicle to continue operating. As a third example, when determining that a different sensor fault causes a non-negligible degradation in the capabilities of the vehicle to detect pedestrians at shorter ranges (e.g., within 10 meters), then the constraint generator may determine a corresponding constraint that requires the vehicle to pull over immediately.

The constraint generator may determine any number and/or type of constraints associated with individual sensor faults or combinations of sensor faults. Such constraints may include, for example, limitations on the driving behaviors/maneuvers that the vehicle is permitted to perform, constraints on the trips/missions that the vehicle is permitted to accept, constraints requiring the vehicle to perform particular actions, and the like. Additional examples of constraints, along with the corresponding constraint conditions that may cause the vehicle to apply the constraints, are described in additional examples herein.

For each constraint, the constraint generator also may determine a set of associated conditions that can be used by the vehicle to determine when to apply the constraint. The constraint conditions may include not the particular sensor (or combination of sensors) associated with the sensor fault, but also may include related conditions such as the duration of the sensor faults and/or the type/characteristics of the sensor faults. For instance, a temporary sensor fault (e.g., a one-second sensor data outage) might result in a negligible performance degradation that does not require a constraint, while a longer sensor fault from the same sensor might cause a significant performance degradation requiring a constraint. Additional conditions that may be associated with constraints may include the current characteristics of the vehicle, and/or the driving conditions (e.g., driving region, weather conditions, road conditions, traffic conditions, etc.) of the vehicle at the time when the sensor fault(s) are detected.

Additionally, the constraint generator may determine and provide different constraints to different vehicle systems, where the different constraints may be associated with the same sensor fault (or the same combination of sensor faults). For instance, different internal systems of an autonomous vehicle (e.g., a perception system, a collision avoidance system (CAS) or other safety system, a localization system, a pose system, etc.) may independently apply different constraints in response to the same sensor fault. In some examples, the fault indications and/or the current system context data (e.g., the current driving state of the vehicle, the states of other objects in the environment, the planned driving route, the current driving environment and conditions, etc.) may map to multiple constraints. In such cases, multiple constraints may be applied concurrently by the vehicle systems in response to receiving the fault indications, along with verifying the current system context data associated with the constraints. When multiple constraints are to be applied concurrently, the fault monitor on the vehicle may evaluate the multiple constraints and determine whether they are consistent with one another or are conflicting. When the multiple constraints are consistent, they can be applied concurrently by transmitting the constraint instructions to the corresponding vehicle systems, and each constraint may be executed without regard for any other constraints currently being applied on the vehicle. When the multiple constraints are conflicting, the fault monitor may determine the most conservative (e.g., most restrictive) constraint (or combination of constraints) to apply, so that the vehicle complies with all required constraints.

As these and other examples illustrate, the techniques discussed herein can improve the functioning of computing devices associated with autonomous and semi-autonomous vehicles in a number of ways. As described herein, a constraint generator may determine the appropriate constraints to apply in response to sensor faults on the vehicle, based on the evaluation of the performance degradations caused by the sensor faults. Based on the constraints provided by the constraint generator, a fault monitor may determine how to operate the vehicle in the instance of individual sensor faults or combinations of sensor faults, along with other constraint conditions. The instructions output by the fault monitor can enable the autonomous vehicle to operate more safely and efficiently when faults occur on the vehicle. For instance, applying the appropriate constraints in response to various sensor faults can improve the functionality and confidence associated with autonomous vehicle functionalities such as object detection, tracking, prediction, and route planning. Further, significantly less processing resources may be used in comparison to conventional techniques that may send duplicative instructions to different systems of the vehicle in response to the occurrence of a sensor fault. The described techniques also may be more accurate than other fault management mechanisms, thereby improving safety outcomes for the vehicle and passengers, as well as surrounding persons and/or objects in the environment. As described above, prior systems may rely on ad hoc constraint determinations associated with individual sensors, which may be overly restrictive in some situations and unnecessarily risky in others. However, the described techniques include executing simulations using perturbed sensor data to determine the degradations of various performance metrics caused by particular sensor faults, thereby allowing the constraint generator to determine more accurate and appropriate constraints based on the performance degradations. These techniques for controlling the vehicle in response to particular sensor faults, based on the performance degradations associated with the sensor faults, provide increased confidence that the vehicle can avoid collisions with pedestrians or other objects by applying more accurate and targeted fault constraints, to improve safety outcomes, performance, and/or accuracy. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In one example, similar techniques may be utilized in driver-controlled vehicles in which such a system may provide an indication to a driver of the vehicle of whether it is safe to perform various maneuvers. In another example, the techniques can be utilized in an aviation or nautical context, or in any system involving objects or entities that may be associated with behavior that is unknown to the system. Such techniques may also be used, for example, in the context of manufacturing and assembly to inspect components as they move down an assembly line. Additionally, the techniques described herein can be used with real data (e.g., captured using sensor(s)), simulated data (e.g., generated by a simulator), or any combination of the two.

FIG. 1 depicts an example system 100 including a constraint generator 102 configured to determine constraints to be applied on vehicles in response to sensor faults. As discussed above, the constraint generator 102 may determine constraints corresponding to sensor faults by analyzing the performance degradations of various vehicle capabilities (e.g., object detection, object tracking, localization, trajectory planning, etc.) caused by the sensor faults.

As shown in this example, vehicle(s) 104 can traverse various environments and generate log data 106 representing the operation of the vehicle(s) 104 within the environments. Though depicted as traversing a real-world environment for illustrative purposes, the techniques described herein may be employed using simulated data and/or a combination of real-world and simulated data. Regardless, the log data 106 may represent any number of driving scenarios encountered and traversed by the vehicle(s) 104, including (but not limited to) highway scenarios, traffic light scenarios, parking scenarios, 4-way intersection scenarios, crosswalk scenarios, lane-change scenarios, etc.). For each driving scenario represented in the log data 106, the log data 106 may include sensor data captured by one or more sensors of the vehicle(s) 104. As described above, a vehicle 104 may include any number of sensors of various different modalities, such as lidar sensors, radar sensors, cameras, audio sensors, time-of-flight sensors, depth sensors, etc. Along with sensor data, the log data 106 received from vehicle(s) 104 may include perception data indicating objects identified by one or more systems onboard the vehicle (or produced during a post-processing phase), prediction data indicating an intent of objects (whether produced during the recording or subsequent thereto), and/or status data indicating diagnostic information, trajectory information, environment information, and any other information determined or generated by the vehicle(s) 104. The vehicle(s) 104 can transmit the log data 106, via a network, to a data store associated with the constraint generator 102 and/or computing devices configured to analyze the log data 106.

The constraint generator 102 may be implemented using one or more computing devices and/or services, including one or more processors and memory communicatively coupled with the processor(s). As shown in this example, the constraint generator 102 may include a perturbation component 108, a simulation component 110, a performance degradation component 112, and a capability analysis component 114. In this example, the constraint generator 102 may be implemented using computing devices and/or systems operating separately and independently from the vehicle(s) 104 and/or vehicle(s) 118. In other examples, any or all of the components of the constraint generator 102 described herein may be performed by a vehicle 104 and/or a vehicle 118.

The perturbation component 108 may identify, within the log data 106, sensor data corresponding to a particular sensor on a vehicle 104. The perturbation component 108 then may perturb (e.g., remove or modify) some or all of the sensor data to mimic a sensor fault. In some examples, the perturbation component 108 may remove a portion of the log data 106 associated with a particular sensor (e.g., one specific lidar sensor, radar sensor, or camera, etc.), while leaving the rest of the sensor data unperturbed, to represent a sensor outage for the particular sensor. Additionally or alternatively, the perturbation component 108 may modify the sensor data associated with the particular sensor, to represent a particular type of sensor fault, noise, anomaly, etc. In some cases, the perturbation component 108 may store and use any number of sensor degradation profiles to modify the sensor data, where different sensor degradation profiles may include patterns of faulty or anomalous sensor data caused by different sensor failures or conditions (e.g., sensitivity errors, temperature-related errors, power errors, network errors, partial occlusion errors affecting a portion of the sensor field-of-view, etc.). When perturbing the sensor data associated with a particular sensor, the perturbation component 108 may perturb (e.g., remove or modify) all of the sensor data for a sensor to represent an ongoing failure or fault, or may perturb portions of sensor data corresponding to smaller time intervals to represent short-term or intermittent faults.

The simulation component 110 may be configured to execute log-based driving simulations based on the log data 106, including the sensor data perturbed by the perturbation component 108 rather than the original unperturbed sensor data within the log data 106. To execute a log-based simulation, the simulation component 110 may use the previously collected log data 106 to generate a simulated environment including simulated objects in which to test a simulated vehicle. A simulated vehicle can represent an autonomous vehicle that is controlled by a vehicle control system to perform various autonomous driving functionality, based at least in part on the simulated environment and simulated objects present in the simulation. The purpose of driving simulations can be to test and validate the capabilities of a simulated vehicle in response to a variety of simulated scenarios that may be encountered in the real world. Driving simulations may model normal or abnormal driving conditions and/or vehicle conditions, using a variety of simulated environments and simulated objects or agents. Such simulations also may model various different traffic conditions, environmental conditions, roadway obstructions, accidents, etc., to test and validate passenger safety, vehicle routing, decision-making, efficiency, etc. Different driving simulations may be used to test individual components or systems of the simulated vehicle (e.g., a perception component, a prediction component, a localization component, a planning component, etc.), while other simulations may test the simulated vehicle as a whole including interactions between the various components or systems of the vehicle. Additional examples and various techniques for executing driving simulations based on vehicle log data can be found, for example, in U.S. patent application Ser. No. 16/834,459, filed on Mar. 30, 2020, and titled, "Autonomous Driving Simulations Based on Virtual Simulation Log data," and in U.S. patent application Ser. No. 18/072,271, filed on Nov. 30, 2022, and titled, "Controlling Agent Movement in Driving Simulations Based on Vehicle Log Data," both of which are incorporated by reference herein in their entirety for all purposes.

Based on the execution of the log-based simulations based on log data 106, as modified by the perturbed sensor data, the simulation component 110 may determine various driving behaviors and/or autonomous driving functionality associated with the corresponding sensor faults. In some examples, the simulation component 110 may determine and store outputs from the various components and/or machine learning models of the simulated vehicle during the log-based simulations, including the perception data from the simulated vehicle (e.g., data indicating detected objects, segmentation data, tracking data, etc.), prediction data (e.g., data indicating intents and/or trajectories of objects), localization data for the simulation vehicle, planning data (e.g., data indicating determined trajectories and contingent trajectories at different times during the simulation, etc.). As described below, the simulation outputs representing the behaviors and functionalities of the simulated vehicle when a sensor fault is present, may be compared to baseline performance data representing the corresponding behaviors and functionalities of the vehicle when no sensor fault is present. In some examples, the simulation component 110 may run multiple sets of similar or identical driving simulations, using the perturbed sensor data and the unperturbed log data 106, and may compare the simulation outputs to determine the effect of the sensor fault on the behaviors of the simulated vehicle.

The performance degradation component 112 may use any number of techniques to determine performance metrics representing the effect of the perturbed sensor data (and thus the effect of the sensor fault) on the autonomous driving behaviors and functionalities of the vehicle 104. In general, to determine the performance degradation associated with the sensor fault, the performance degradation component 112 may compare a first set of metrics representing the performance of a vehicle controller when the sensor fault is present, with a second set of metrics representing the performance of a vehicle controller when the sensor fault is not present. As described above, the performance of the vehicle when the sensor fault is present may be determined using the simulation component 110 to execute log-based driving simulations with perturbed sensor data to mimic the sensor fault.

To determine the corresponding performance metrics when the sensor fault is not present, the performance degradation component 112 may use ground truth data from the log data 106, and/or may use the simulation component 110 to perform similar or identical driving simulations using the same log data 106 with unperturbed sensor data. For instance, during a process for determining the performance degradation for a pedestrian detection metric caused by a sensor fault, the performance degradation component 112 may compare the results of a simulation based on perturbed sensor data (e.g., whether or not a pedestrian was detected) with the corresponding log data 106 indicating whether or not a pedestrian was detected within the perception data of the log data 106. Additionally or alternatively, the performance degradation component 112 may compare the results of the simulation based on perturbed sensor data with the results of a different simulation based on unperturbed sensor data, to determine whether a pedestrian was detected at the same time in both simulations.

Although the above example describes a single comparison between the results of a simulation using perturbed sensor data to represent a sensor fault, and a corresponding simulation or ground truth data representing no sensor fault, it can be understood that the performance degradation component 112 can perform any number of comparisons and/or analyses to determine the various effects of the sensor fault on the functioning of the vehicle(s) 104. For instance, the constraint generator 102 may perform similar operations on any number of different log data 106 from vehicle(s) 104, representing a wide range of driving scenarios, environments, static and dynamic objects, and/or object interactions with the vehicle. In some examples, the constraint generator 102 may access a driving scenario database including hundreds or thousands of scenarios, where each driving scenario includes a set of log data 106 that can be perturbed in a similar way to mimic the same sensor fault. By executing simulations on large numbers of driving scenarios, using sensor data perturbations to inject the same sensor fault into each driving scenario, the performance degradation component 112 can receive a large amount of data reflecting the performance of the vehicle control system when the sensor fault is present. For each simulation based on a different driving scenario, the performance degradation component 112 may compare the simulation results to the baseline performance (e.g., ground truth log data and/or simulation results with unperturbed data), to determine the effect of the sensor fault on the autonomous driving functionality of the vehicle.

In some examples, the performance degradation component 112 can perform different comparative analyses (e.g., vehicle performance with and without a sensor fault) for different autonomous driving functionalities. As described below, the performance degradation component 112 may determine performance degradation metrics for individual autonomous driving capabilities (e.g., object detection, object segmentation, object tracking, localization, object trajectory prediction, route planning, etc.). Additionally, for any or all of the autonomous driving capabilities, the performance degradation component 112 may determine performance degradation metrics for different object types (e.g., object detection of pedestrians, object detection of vehicles, object detection of bicycles, etc.) and/or performance degradation metrics for different distances (e.g., object detection of pedestrians from 10 meters, object detection of pedestrians from 20 meters, . . . , object detection of pedestrians from 50 meters, etc.). Additionally or alternatively, the performance degradation component 112 may determine performance degradation metrics associated with any number of different driving scenario conditions (e.g., driving region, time of day, lighting conditions, weather conditions, road conditions, traffic conditions, etc.).

Performance metrics for autonomous driving functionalities, and corresponding performance degradation metrics, can be generated and evaluated using any number of statistical techniques. For example, the performance of particular autonomous driving functionality (e.g., object detection) can be expressed as a graph, histogram, and/or probability distribution. Various statistical techniques, such as computing a Bhattacharyya distance between two histograms, or computing a Kullback-Leibler divergence between two probability distributions, etc., can be used to determine the performance degradation metrics. Additional examples and techniques for determining error models based on vehicle data and ground truth data can be found, for example, in U.S. patent application Ser. No. 16/708,019, filed on Dec. 9, 2019, and titled, "Perception Error Models," the entire contents of which is incorporated by reference herein for all purposes.

As described in more detail below, performing multiple analyses based on the same sensor fault may allow the performance degradation component 112 to determine a more holistic understanding of the overall effect of the sensor fault on the autonomous driving capabilities of the vehicle as a whole. Additionally, the performance degradation component 112 may use these comparative analyses to determine conditional performance degradations associated with the sensor fault. For instance, the performance degradation component 112 may determine that a particular sensor fault causes significant performance degradations for certain functionalities of an autonomous vehicle but not others, for certain object types but not others, at certain distances and not others, and/or in certain driving environments but not others. As described below, when a sensor fault causes such types of conditional performance degradations, the capability analysis component 114 may determine conditional constraints that the vehicle may apply when the sensor fault occurs only for certain autonomous driving functionalities and/or only when the other constraint conditions are present.

The capability analysis component 114 may use the performance degradation metrics associated with a sensor fault to determine an appropriate constraint to be applied on the vehicle when the sensor fault occurs. In some examples, if the performance degradation caused by a particular sensor fault (e.g., across all autonomous driving functionality, distance ranges, conditions, etc.) is negligible, which, in some examples may be that the difference—and/or aggregated difference (e.g., using a weighted average between factors) for multiple factors—is less than or equal to a first threshold, then the capability analysis component 114 may determine that no constraint should be applied in the event of the sensor fault. The determination that the performance degradation caused by a sensor fault is negligible may be based on comparing the performance degradation to a threshold value (e.g., 90% of the baseline performance), and/or determining that the performance degradation is within the noise level of the vehicle's baseline performance.

When the performance degradation caused by a sensor fault is sufficiently high (e.g., greater than a threshold or baseline noise level), then the capability analysis component 114 may determine one or more constraints to apply on the vehicle when the sensor fault occurs. As described above, in various examples the constraints may include dynamic constraints (e.g., limitations on particular driving behaviors or maneuvers that the vehicle may perform), mission constraints (e.g., constraints on the driving trips that the vehicle is permitted to accept), constraints requiring the vehicle to perform particular actions, and/or various other constraints limiting or restricting the operation of the vehicle. In various examples, determining the particular constraints to apply on the vehicle based on the performance degradations (which may include determining a constraint type and determining the specific values/thresholds for the constraint type) can be performed based on predetermined vehicle performance standards and/or driving safety targets.

After determining one or more constraints for a sensor fault, based on the performance degradation associated with the sensor fault, the constraint generator 102 may transmit the constraints 116 to one or more vehicles 118. As described below, vehicles 118 may include fault monitor systems configured to detect various types of sensor faults (and/or other vehicle system faults), and to apply the constraints 116 in response to the detection of the certain sensor faults (and/or other vehicle system faults).

As described in the above example, the constraint generator 102 may determine one or more constraints to be applied on vehicles 118 in response to a particular sensor fault. However, in other examples, the constraint generator 102 can use similar or identical techniques determine constraints 116 to be applied in response to specific combinations of multiple sensor faults occurring on a vehicle 118. Additionally, the constraint generator 102 may determine various durations of time associated with different constraints 116. For instance, a first constraint 116 may be provided to the vehicles 118 with an immediate time condition indicating that the first constraint 116 should be applied in response to any occurrence of the associated sensor fault. However, a second constraint 116 may be provided to the vehicles 118 with a time interval condition indicating that the constraint 116 should be applied in response to occurrences of the associated sensor fault that persist for longer than the time interval (e.g., 0.5 secs, 1 sec, 2 secs, 10 secs, etc.). The constraint generator 102 also may determine constraints 116 having conditions corresponding to particular driving regions, driving scenarios, driving times, driving conditions (e.g., traffic conditions, weather conditions, etc.), based on the performance degradation caused by the sensor fault when the particular conditions are present. Further, as discussed below, the constraint generator 102 also may determine constraints 116 to be provided to and applied by different vehicle systems within the vehicle(s) 118. For instance, various systems within a vehicle 118, such as perception system, a safety system (e.g., a CAS), a localization system, a pose system, a traffic light detection system, etc., each may receive and independently apply different sets of constraints 116 in response to various sensor faults.

Figure 2:
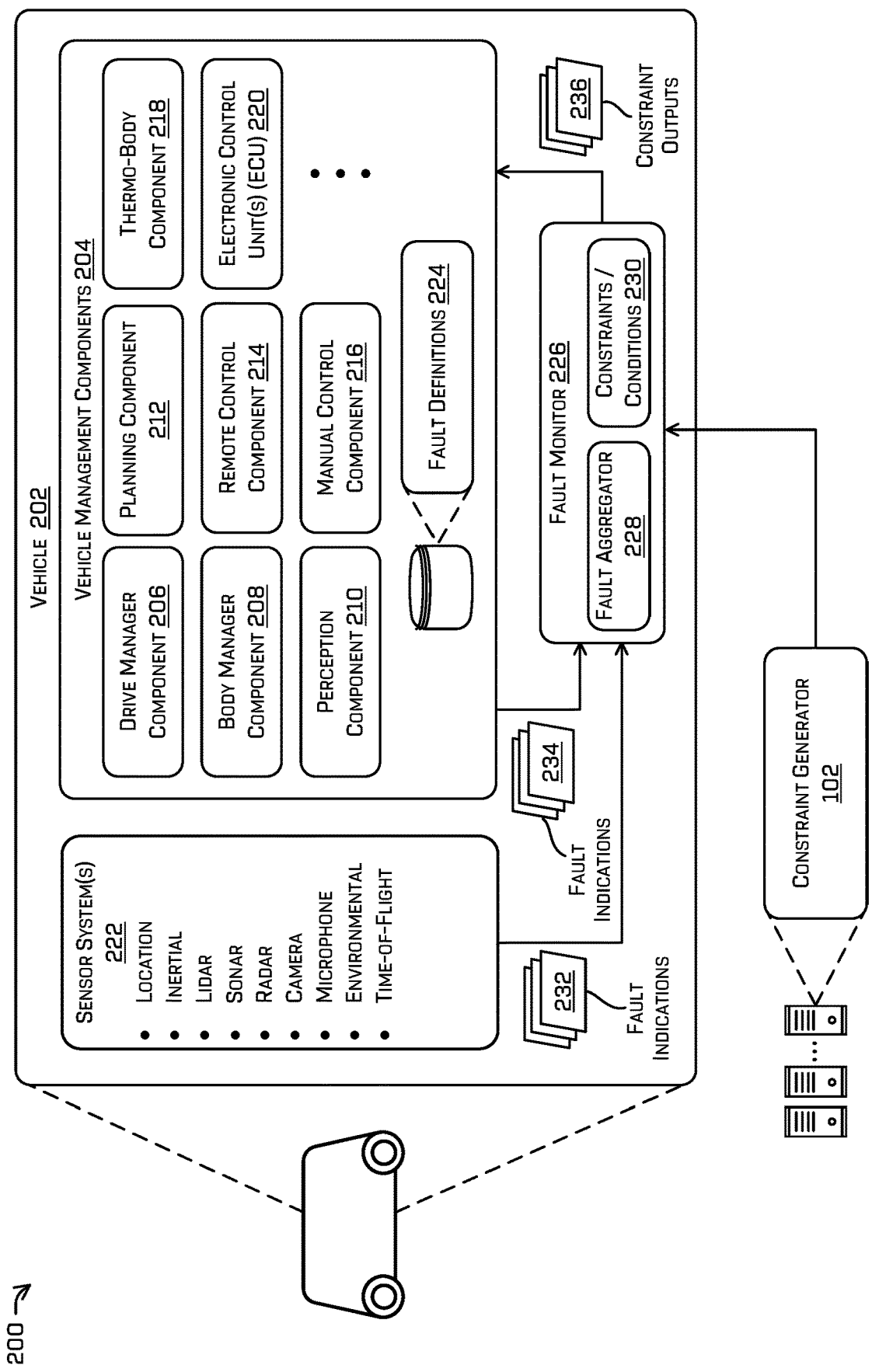
FIG. 2 is a block diagram illustrating an autonomous vehicle and a constraint generator component configured to determine constraints and conditions for controlling the autonomous vehicle in response to various faults, in accordance with one or more examples of the disclosure.

FIG. 2 illustrates a fault management system 200 including a vehicle 202 and a constraint generator 102 configured to determine constraints 116 and associated conditions for the vehicle 202 to apply in response to various sensor faults. In various examples, the vehicle 202 may be an autonomous, semi-autonomous, or manually controlled vehicle, and may include a fault monitor 226 and related components configured to detect faults and apply the corresponding constraints 116 received from the constraint generator 102.

As shown in this example, the vehicle 202 may include one or more vehicle management components 204. The vehicle management components 204 may provide hardware and/or software to control vehicle components, monitor vehicle components, and/or communicate with other vehicle components. In this example, the vehicle management components 204 include a drive manager component 206, a body manager component 208, a perception component 210, a planning component 212, a remote control component 214, a manual control component 216, a thermo-body component 218, and one or more electronic control unit(s) (ECUs) 220. Other examples of vehicle management components 204 are considered as well.

In some examples, the drive manager component 206 may perform functions associated with controlling steering, braking, inverters, traction system(s), parking brake(s), vehicle suspension, and the like, in association with executing a trajectory for the vehicle 202. The body manager component 208, may perform functions associated with windows, doors, mirrors, seats, and so forth. The perception component 210 may perform various autonomous driving functions, for instance, functions associated with object detection, segmentation, classification, and/or tracking. The planning component 212 may receive information from the perception component 210, and may use the information to generate object predictions and/or generate trajectories for the vehicle 202 to follow to traverse the environment. In some examples, the planning component 212 may determine whether a trajectory is feasible for the vehicle 202 to execute or not, such as before the trajectory is supplied to the fault monitor 226. The remote control component 214 may perform functions associated with communication between a remote computing device and the vehicle 202. For instance, the remote control component 214 may cause the vehicle 202 to initiate communication with a remote teleoperations computing device or other remote services that may, at times, control the vehicle (e.g., under the control of a human remote from the vehicle 202 via the remote computing device). The manual control component 216 may enable functionality for a human driver to control the vehicle 202 to traverse the environment. The thermo-body component 218 may monitor and/or regulate temperature of various components of the vehicle 202. In some examples, the ECUs 220 may correspond to any hardware component of the vehicle 202 that may communicate over a network with other systems and/or components of the vehicle 202.

As shown in this example, the vehicle 202 also may include any number of sensor systems 222, which may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The vehicle 202 may include multiple instances of each of these or other types of sensors. For instance, the lidar sensors may include individual short-range and/or long-range lidar sensors located at the corners, front, back, sides, and/or top of the vehicle 202. As another example, the camera sensors may include multiple cameras disposed at various locations about the exterior and/or interior of the vehicle 202. The sensor system(s) 222 may provide input (e.g., sensor data) to any or all of the vehicle management components 204.

Any or all of the vehicle management components 204, and/or sensor systems 222 may comprise storage storing one or more fault definitions 224. The fault definitions 224 may be associated with a particular fault of a corresponding sensor system 222, or a corresponding vehicle management component 204. In some cases, the fault definitions 224 may include information such as a type of fault, a severity of the fault, a threshold value associated with the fault, a recommended reaction to the fault, a fault clearing mechanism, and so on. As shown in this example, when one of the sensor systems 222 experiences a fault, the sensor system 222 may output a fault indication 232 to the fault monitor component 226. Similarly, when one of the vehicle management components 204 experiences a fault, the vehicle management component 204 may output a fault indication 234 to the fault monitor component 226.

In some examples, the fault indications 232 and 234 may include various data identifying and/or explaining the fault, such as fault identifier, a fault reaction, and/or a fault detection threshold. A fault identifier may be predetermined based on the particular fault experienced by a component of the vehicle 202 and overseen by the vehicle management component 204 or sensor system 222 which generated the fault. A fault reaction may be a predetermined recommended instruction associated with the fault for how the vehicle management component 204 or sensor system 222 should react to mitigate the fault. The fault detection threshold may be a value that was exceeded by a component of the vehicle that caused the component to output the fault. In some cases, the vehicle management components 204 and/or sensor systems 222 may output component diagnostics to the fault monitor component 226 as well, which may indicate a status of components monitored by the vehicle management components 204 and/or sensor systems 222, such as whether a component or system is on or off, a temperature, a voltage, a current, a speed, a size, a frequency, and the like.

As discussed above, the fault monitor component 226 may receive fault indications 232 and 234 from the various vehicle components, and may map the fault identifiers to one or more constraints received from the constraint generator 102. The fault monitor component 226 may include a fault aggregator 228 configured to aggregate and track fault indications 232 and 234. Using the fault aggregator 228, the fault monitor component 226 may determine the duration of a fault associated with a sensor system 222 or vehicle management components 204, and/or may determine when a combination of faults have occurred concurrently on the vehicle 202. Based on the fault indications 232 and 234, as tracked and aggregated using the fault aggregator 228, the fault monitor component 226 may determine when the current faults occurring on the vehicle 202 map to one or more constraints received from the constraint generator 102.

As discussed above, the fault aggregator 228 also may receive system context data, in addition to various fault indications, and may analyze the combination of current vehicle faults and system context data to determine when the combination maps to one or more constraints. The system context data may include, for instance, the current state and planned route of the vehicle (e.g., current position, pose, driving direction, velocity, etc.), and data relating to the current driving environment. For instance, the constraints and conditions component 230 may store the set of constraints received from the constraint generator 102, including the corresponding sets of faults and/or other associated conditions associated with each constraint.

When the fault monitor component 226 determines a constraint to be applied by the vehicle 202 to resolve or mitigate a fault, it may generate a constraint output 236 to provide to the appropriate vehicle management systems 204. As noted above, determining a constraint to be applied may include determining that the corresponding faults and/or associated conditions for a particular constraint have occurred. Each constraint also may include an associated constraint output 236, including the constraint actions and/or instructions, and an indication of the vehicle management components 204 that are responsible for performing actions to execute the constraint. In some cases, a constraint output 236 associated with a constraint may be provided to the same sensor system 222 and/or vehicle management component 204 from which the fault indication was received. Alternatively or additionally, a constraint output 236 may be provided by the fault monitor output to a different one (or more) of the vehicle management components 204 to perform actions to execute the constraint, other than the vehicle management component 204 or sensor system 222 from which the fault indication was received. Thus, the fault monitor component 226 may function as a central location to receive and aggregate fault indications from various sensor systems and vehicle components, and to distribute constraints to various systems/components in the vehicle 202 to efficiently and safely mitigate the fault.

Figure 3:
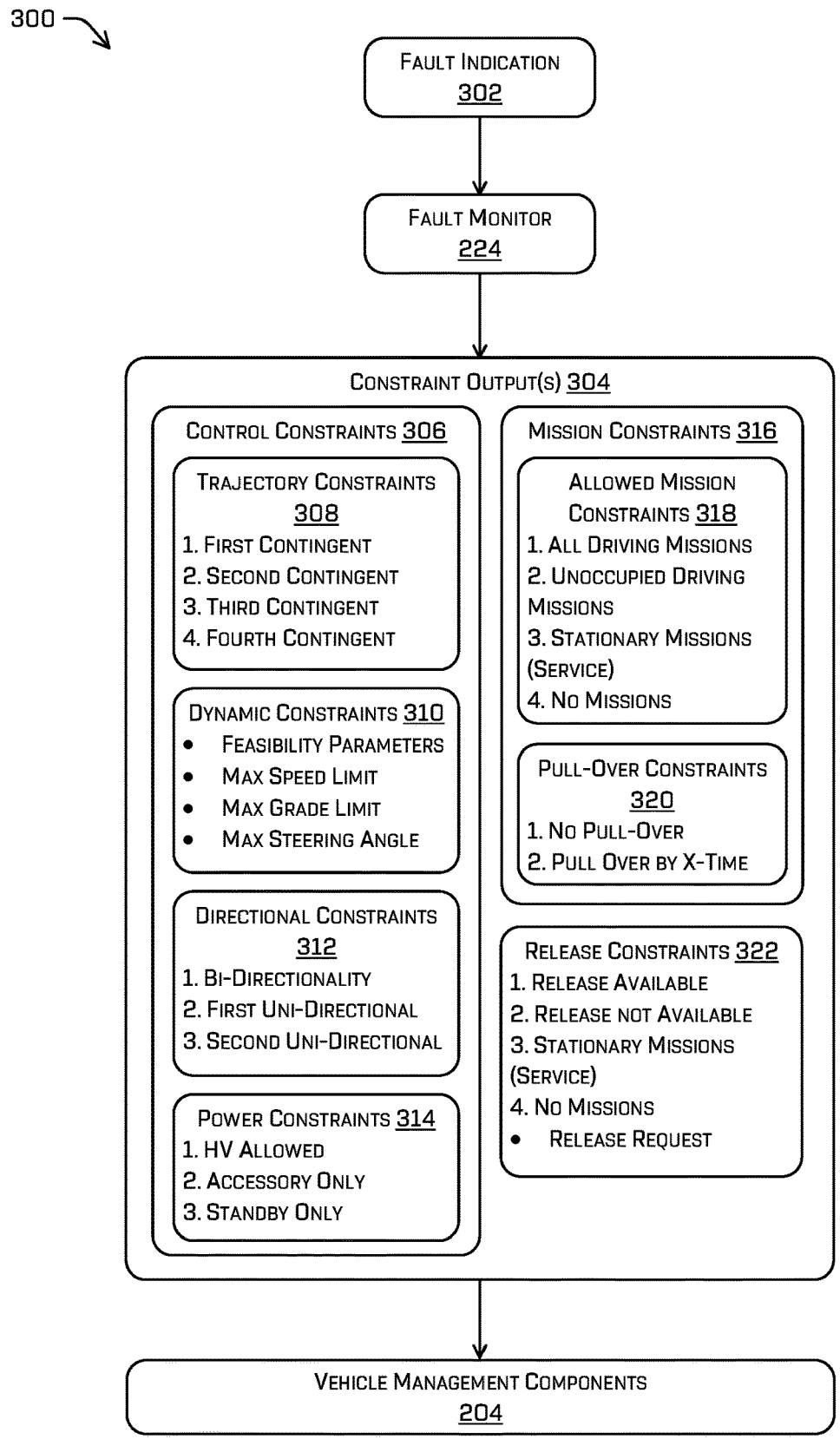
FIG. 3 is an illustration of a system including various example constraint outputs by a fault monitor in response to a fault indication, in accordance with one or more examples of the disclosure.

FIG. 3 is an illustration of a system 300 including a number of example constraints that may be stored and output by a fault monitor component 226, in response to detecting fault indications and/or other conditions on a vehicle.

The example system 300 includes the fault monitor component 226 described above in FIG. 2, which may receive a fault indication 302 from one of the vehicle management components 204 and/or sensor systems 222 as described above. The fault monitor component 226 may map information included in the fault indication 302 to a corresponding constraint. The fault monitor component 226 may output, based on the mapping, one or more constraint output(s) 304 to an appropriate vehicle management system 204 to execute one or more actions responsive to the constraint indicated in the constraint output 304. In this example, the restrictions included in the individual constraint outputs 304 may be listed in a descending order of restrictiveness on actions performed by the vehicle 202 when numerals are present, where 1 may correspond to a least restrictive constraint on an action, 2 may correspond to a more restrictive constraint on the action than 1, 3 may correspond to a more restrictive constraint on the action than 1 and 2, and so forth.

In this example, the constraint outputs 304 may include control constraints 306 that constrain actions related to how the vehicle 202 itself operates. In some cases, the control constraints 306 may include trajectory constraints 308 that correspond to different types of contingent trajectories that the vehicle 202 may be constrained to follow. A first contingent trajectory may correspond to all trajectories that the planning component 212 may output (e.g., a nominal trajectory according to a plan without a presence of a fault). Despite being able to execute all trajectories according to the first contingent, the vehicle 202 may output information associated with the fault indication 302 to a remote computing device (e.g., when a maintenance operation may be needed but does not prevent the vehicle from operating). A second contingent may correspond to a constraint that requires the vehicle 202 to pull over within a predetermined amount of time (e.g., 30 seconds, 1 minute, 2 minutes, 5 minutes, etc.), and/or at a particular location type (e.g., a parking lot, a recharging station, a maintenance location, etc.). A third contingent trajectory may correspond to a constraint that requires the vehicle 202 to pull over within a predetermined amount of time that is less than the predetermined amount of time associated with the second contingent (e.g., 15 seconds, 30 seconds, 1 minute, etc.), and/or at a side of the road or any other safe and legal location within a predetermined distance (e.g., 400 feet, half a mile, one mile, etc.). A fourth contingent trajectory may correspond to a constraint that requires the vehicle 202 to stop immediately.

In some examples, the control constraints 306 may also include dynamic constraints 310 that may correspond to how the vehicle 202 may proceed through the environment, and/or restrictions on the environment that the vehicle 202 may traverse through. For instance, the dynamic constraints 310 may include feasibility parameters that may restrict environmental conditions that the vehicle 202 may traverse through, such as weather restrictions (e.g., related to snow, rain, temperature, wind speed, etc.), terrain restrictions (e.g., gravel roads, dirt roads, bridges, train tracks, etc.), a geographic region restrictions (e.g., city, suburb, rural, etc.), traffic restrictions (e.g., stop-and-go traffic, traffic traveling at a minimum or maximum speed, etc.), road network restrictions (e.g., side roads, arterials, highways, interstates, etc.), and the like. Alternatively or additionally, the dynamic constraints 310 may include a maximum (or minimum) speed limit (e.g., 5 mph, 20 mph, 35 mph, 50 mph, etc.). In examples, the dynamic constraints 310 may include a maximum (or minimum) grade limit that the vehicle 202 may traverse (e.g., 15 degrees, 20 degrees, 30 degrees, etc.). In some cases, the dynamic constraints 310 may include a maximum (or minimum) steering angle that the vehicle 202 may perform (e.g., 20 degrees, 30 degrees, 45 degrees, 90 degrees, etc.). The steering angle may be, in some examples, a constant steering angle, and/or may be dictated based on a speed of the vehicle 202 (e.g., a permitted steering angle of 90 degrees at or below 20 mph and a permitted steering angle of 45 degrees above 20 mph, to name one illustrative example). The dynamic constraints 310 may also include constraints relating to a number of wheels that may be used to control steering of the vehicle (e.g., two-wheel steering, four-wheel steering, etc.).

The control constraints 306 may further include directional constraints 312 that may constrain a direction that the vehicle 202 may proceed through the environment. In some examples, the vehicle 202 may be a bi-directional vehicle that is configured to proceed through the environment in a forward direction (e.g., according to a direction of traffic) with either one of at least two ends of the vehicle in a "front" of the traveling direction. The directional constraints 312 may include a bi-directional restriction, where the vehicle 202 may proceed in either of two directions in spite of the presence of the fault indication 302. Similar to the trajectory constraints 308, the vehicle 202 may output information associated with the fault indication 302 when the bi-directional restriction is in place to a remote computing device (e.g., when a maintenance operation may be needed but does not prevent the vehicle from operating). The directional constraints 312 may also include a first uni-directional restriction and a second uni-directional restriction, which correspond to restrictions on the vehicle 202 to proceed in only one of the two bi-directional directions.

In some examples, the control constraints 306 may include power constraints 314 that restrict power usage by one or more components and/or systems of the vehicle 202. The power constraints 314 may include a high-voltage (HV) allowed restriction, that allows power to be used by the components and/or systems of the vehicle 202 according to normal operating functions. Similar to the trajectory constraints 308 and the directional constraints 312, the vehicle 202 may output information associated with the fault indication 302 when the HV allowed restriction is in place to a remote computing device (e.g., when a maintenance operation may be needed but does not prevent the vehicle from operating). In examples, the power constraints 314 may include an accessory only restriction, in which functionality associated with predetermined components may be permitted (e.g., display screen, radio, lights, fan, HVAC, etc.), but other predetermined components are not permitted to operate (e.g., motor, drive controller, etc.). In some cases, the power constraints 314 may include a standby only restriction, in which background components (e.g., clock, security system, etc.) are permitted to operate, but no other systems are permitted to operate.

The constraint outputs 304 may include mission constraints 316 that constrain which types of missions the vehicle 202 may undertake. For instance, an air conditioning system of the vehicle 202 may not be functioning, but other systems of the vehicle 202 may be operating properly. In this example, the vehicle 202 may be permitted to proceed to a maintenance location to receive maintenance on the air conditioning system as normal, but may not be permitted to transport passengers (due to possible temperature discomfort in a cabin of the vehicle 202) until the air conditioning system is repaired. Accordingly, the mission constraints 316 may include allowed mission constraints 318 that provide instructions on missions that the vehicle 202 is allowed to take on. The allowed mission constraints 318 may include an all driving missions restriction, that permits the vehicle 202 to perform multiple types of driving missions, e.g., with and without passengers. Similar to the trajectory constraints 308 and the directional constraints 312, the vehicle 202 may output information associated with the fault indication 302 when the all missions restriction is in place to a remote computing device (e.g., when a maintenance operation may be needed but does not prevent the vehicle from operating). The allowed mission constraints 318 may include an unoccupied driving missions restriction that allows the vehicle 202 to proceed through the environment without passengers inside of the vehicle. In some examples, the allowed mission constraints 318 may include a stationary missions restriction, which may permit functionality necessary for service and/or maintenance of the vehicle 202. The allowed mission constraints 318 may further include a no missions restriction that may prevent the vehicle 202 from taking on any missions.

In some examples, the mission constraints 316 also may include pull-over constraints 320 that provide instructions relating to how, where, and/or when the vehicle 202 should pull over to resolve a fault included in the fault indication 302. The pull-over constraints 320 may include a no-pull over restriction indicating that the vehicle 202 does not need to pull over to resolve the fault, and/or should not pull over to resolve the fault. The pull-over constraints 320 may also include a pull over by x-time (and/or x-distance) restriction that provides a maximum time (e.g., 30 seconds, 1 minute, 5 minutes, 10 minutes, etc.) and/or a maximum distance (e.g., 400 feet, half a mile, one mile, etc.) within which the vehicle 202 is to pull over to resolve the fault.

In some examples, the constraint outputs 304 may include release constraints 322 that provide restrictions relating to how, where, and/or when the vehicle 202 may return to normal operation when a fault included in the fault indication 302 is resolved. The release constraints 322 may include a release available restriction in which the vehicle may resume normal operations upon the fault monitor component 226 receiving an indication that the fault has been resolved. In some examples, the release constraints 322 may include a release not available restriction, where the fault monitor component 226 is not permitted to independently release the vehicle 202 to resume normal operations without receiving a permitting instruction from a remote computing device and/or a human. The release constraints 322 may include a stationary missions restriction, in which the vehicle 202 may undertake necessary operations to arrive at a service location to receive service associated with the fault. In some cases, the release constraints 322 may include a no missions restriction, in which even when the fault is resolved, the vehicle 202 may not undertake any additional missions. Any one of the release constraints 322 may be associated with a release request, which enables a human to release the vehicle 202 to perform actions (e.g., proceed normally) to traverse the environment and/or to receive service or maintenance.

Figure 4:
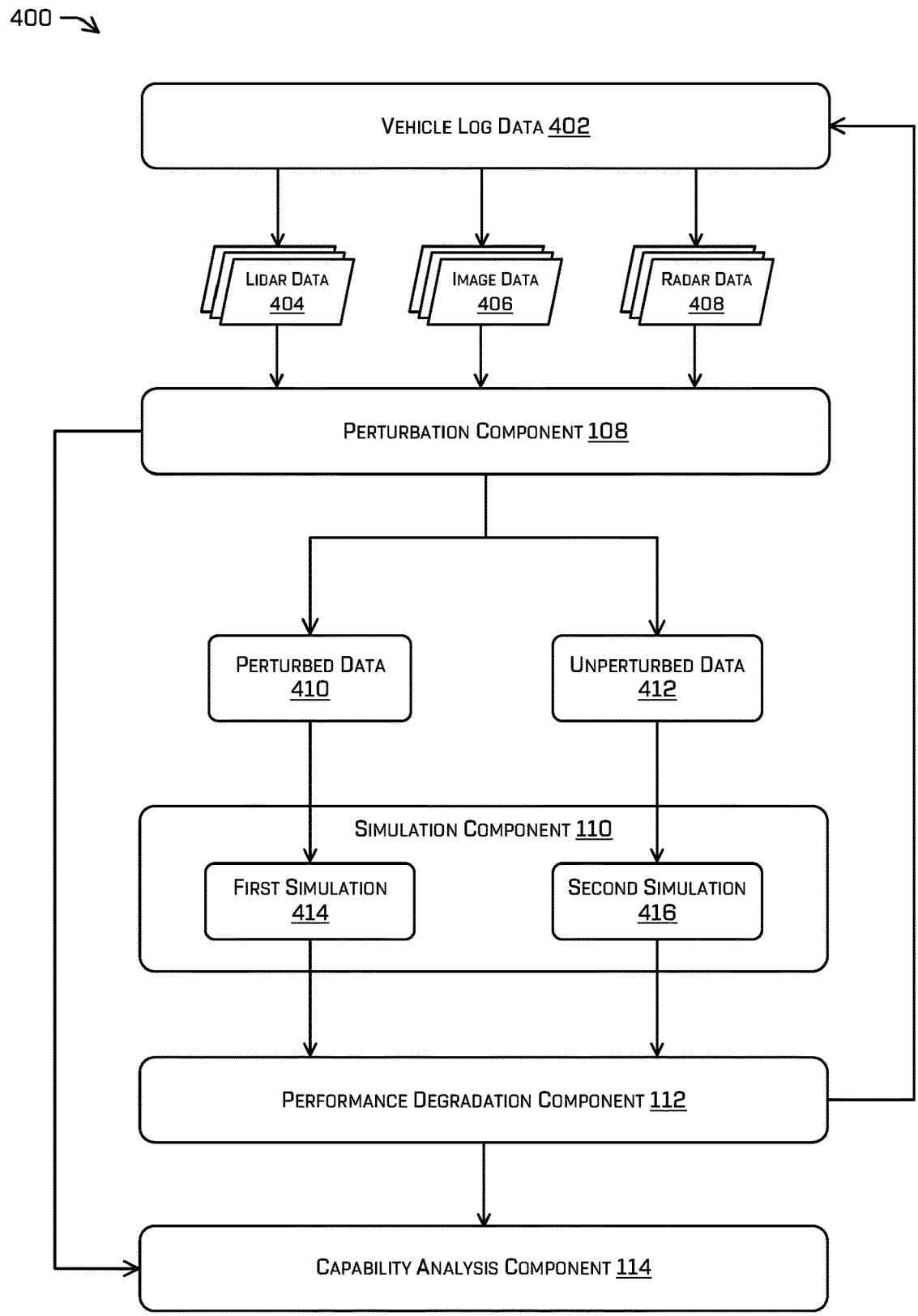
FIG. 4 is a block diagram illustrating components of an example constraint generator configured to determine constraints associated with sensor faults, in accordance with one or more examples of the disclosure.

FIG. 4 depicts an example system 400 including components of a constraint generator 102, arranged to determine an on-vehicle constraint to be applied by one or more vehicles 118 in response to a particular sensor fault. In some examples, the system 400 may correspond to the system 100 discussed above.

As shown in this example, the system 400 may receive vehicle log data 402, which may correspond to an instance of the log data 106, described above. For example, the vehicle log data 402 may represent the log data captured by and/or generated by a vehicle 104 associated with a particular driving scenario. As shown in this example, the log data 402 may include sensor data representing different sensor modalities over the duration of the driving scenario, including lidar data 404 associated with multiple lidar sensors on the vehicle 104, image data 406 associated with multiple cameras on the vehicle 104, and radar data 408 associated with multiple radar sensors on the vehicle 104.

The perturbation component 108, as discussed above, may be configured to perturb the sensor data associated with one particular sensor in the vehicle log data 402, while leaving the sensor data for the remaining sensors unperturbed. For instance, based on input and/or a random selection process, the perturbation component 108 may determine a specific sensor on the vehicle and perturb the data associated with that sensor throughout the log data or for specific time intervals within the log data. As discussed above, the perturbation component 108 may remove sensor data associated with the sensor to mimic a sensor outage, or may modify/replace the sensor data to mimic a sensor error or other anomaly. Additionally, although some examples herein describe perturbing the sensor data for a single sensor only, in other examples the perturbation component 108 may perturb the sensor data for any subset or combination of sensors in the log data, including multiple sensors of the same modality and/or sensors of different modalities.

After perturbing the sensor data associated with one or more sensors within the log data 402, the system 400 may provide the perturbed data 410 representing the driving scenario in the log data 402, and the corresponding unperturbed data 412 representing the same scenario, to the simulation component 110. As shown in this example, the simulation component 110 may execute a first simulation 414 one or more times based on the perturbed data 410, and may execute a second simulation 416 one or more times based on the unperturbed sensor data 412. As discussed above, during these simulations, a simulated vehicle controlled by vehicle control systems executing within the simulation component 110 may respond to the simulated environment and simulated objects within the log data 402 (as perceived via the sensor data) to perform autonomous driving functionality such as object detection, segmentation, classification, tracking, localization, trajectory prediction, and route-planning, etc. The outputs from any or all of the components or functions performed by the simulated vehicle, including perception data, prediction data, localization data, planning data, etc., may be provided to the performance degradation component 112 for comparative analyses.

As described above, although this example described injecting sensor faults using perturbed sensor data, in other examples the faults may be associated with other components (e.g., non-sensor components) of the vehicle. In some cases, the constraint generator 102 may be configured to inject other various faults (e.g., errors, system failures, capability degradations, etc.) into one or more of the drive systems of the vehicle. Examples of faults within the drive systems of the vehicle may include, for instance, errors, component failures, and/or degradations in capabilities of the braking system(s), steering system(s), propulsion systems, stability control system, power system(s), etc., of the vehicle. Faults occurring within the drive systems of a vehicle may or may not manifest as perturbed sensor data within the vehicle logs. Thus, to mimic such faults, the constraint generator 102 may or may not perturb sensor data (or any other log data). In some examples, mimicking certain types of faults (e.g., drive systems faults) may include using separate vehicle kinematic models (e.g., motion models) in the different simulations 414 and 416. As an example, a first simulation 414 performed to mimic a failure of a redundant braking system may be performed using a first vehicle kinematics model and/or first kinematics analysis of the simulation, and the second simulation 416 performed to mimic the baseline case of no braking system failure may be performed using a different second vehicle kinematics model and/or different second kinematics analysis of the simulation. In various other examples, the constraint generator 102 may be configured to inject faults and/or functionality degradations by perturbing the sensor data (and/or other log data), and/or by using different motion models/kinematics analysis during the driving simulations.

The performance degradation component 112 may use the various techniques described herein to compare the outputs of the first simulation 414, based on the perturbed sensor data 410, with the outputs of the second simulation 416, based on the unperturbed sensor data 412. In some examples, such techniques may include comparing various perception performance metrics to determine whether the perturbed data 410 causes a non-negligible degradation in the performance of the perception functionalities by the simulated vehicle. Additionally or alternatively, these techniques may include comparing the prediction data (e.g., predicted trajectories for dynamic objects) and/or planning data (e.g., routes/trajectories determined for the simulated vehicle) at different times during the simulation, to determine whether the perturbed data 410 causes a non-negligible change in the prediction and planning outputs of the simulated vehicle.

In some examples, instead of (or in addition to) performing a second simulation 416 based on unperturbed sensor data 412, the performance degradation component 112 may use ground truth data from the vehicle log data 402 to evaluate the performance of the first simulation 414, based on the perturbed sensor data 410. However, performing the second simulation 416 using the unperturbed sensor data 412 may provide technical advantages and improved accuracy in some cases. For example, the simulated environment and vehicle dynamics model implemented by the simulation component 110 might not be precisely the same as the real-world driving environment and real-world vehicle dynamics from which the log data 402 was generated. As a result, executing separate sets of corresponding simulations, based on perturbed and unperturbed sensor data, may provide a more accurate comparative analysis for measuring the performance degradations caused by the perturbed sensor data. Further, in some examples, certain components within the vehicle systems (e.g., machine learning models for perception, prediction, and planning, etc.) may be highly complex and/or non-deterministic. In such cases, the simulation component 110 can be configured to execute the first simulation 414 and second simulation 416 multiple times each, in order to determine distributions of outcomes from the complex or non-deterministic components. As an example, the second simulation 416 (which may include any number of simulations or batteries of simulations based on the unperturbed sensor data) can be executed multiple times to determine a probability distribution and noise level for its various outputs. In this example, the performance degradation component 112 may compare the results of the first simulation 414 (which also may be executed multiple times) to the noise level associated with the second simulation 416, to determine if the performance degradation caused by the perturbed data 410 is within or outside of the noise level of normal operations of the vehicle systems.

As discussed above, the capability analysis component 114 may use the metrics determined by the performance degradation component 112, to determine appropriate constraints to be applied on the vehicle in response to sensor faults. In some examples, the capability analysis component 114 may evaluate the performance degradation associated with the perturbed data 410 relative to a threshold or baseline performance metric to determine whether a constraint should be applied to the sensor fault. When the capability analysis component 114 determines that a constraint should be applied, it may determine the characteristics of the sensor fault (e.g., sensors affected, fault type, duration, associated driving conditions, etc.) from the perturbation component 108, and may the sensor fault and associated conditions to the constraint.

The capability analysis component 114 may use the performance degradation metrics associated with a sensor fault to determine an appropriate constraint to be applied on the vehicle when the sensor fault occurs. In some examples, if the performance degradation caused by a particular sensor fault (e.g., across all autonomous driving functionality, distance ranges, conditions, etc.) is negligible, then the capability analysis component 114 may determine that no constraint should be applied in the event of the sensor fault. The determination that the performance degradation caused by a sensor fault is negligible may be based on comparing the performance degradation to a threshold value (e.g., 90% of the baseline performance), and/or determining that the performance degradation is within the noise level of the vehicle's baseline performance.

Figure 5:
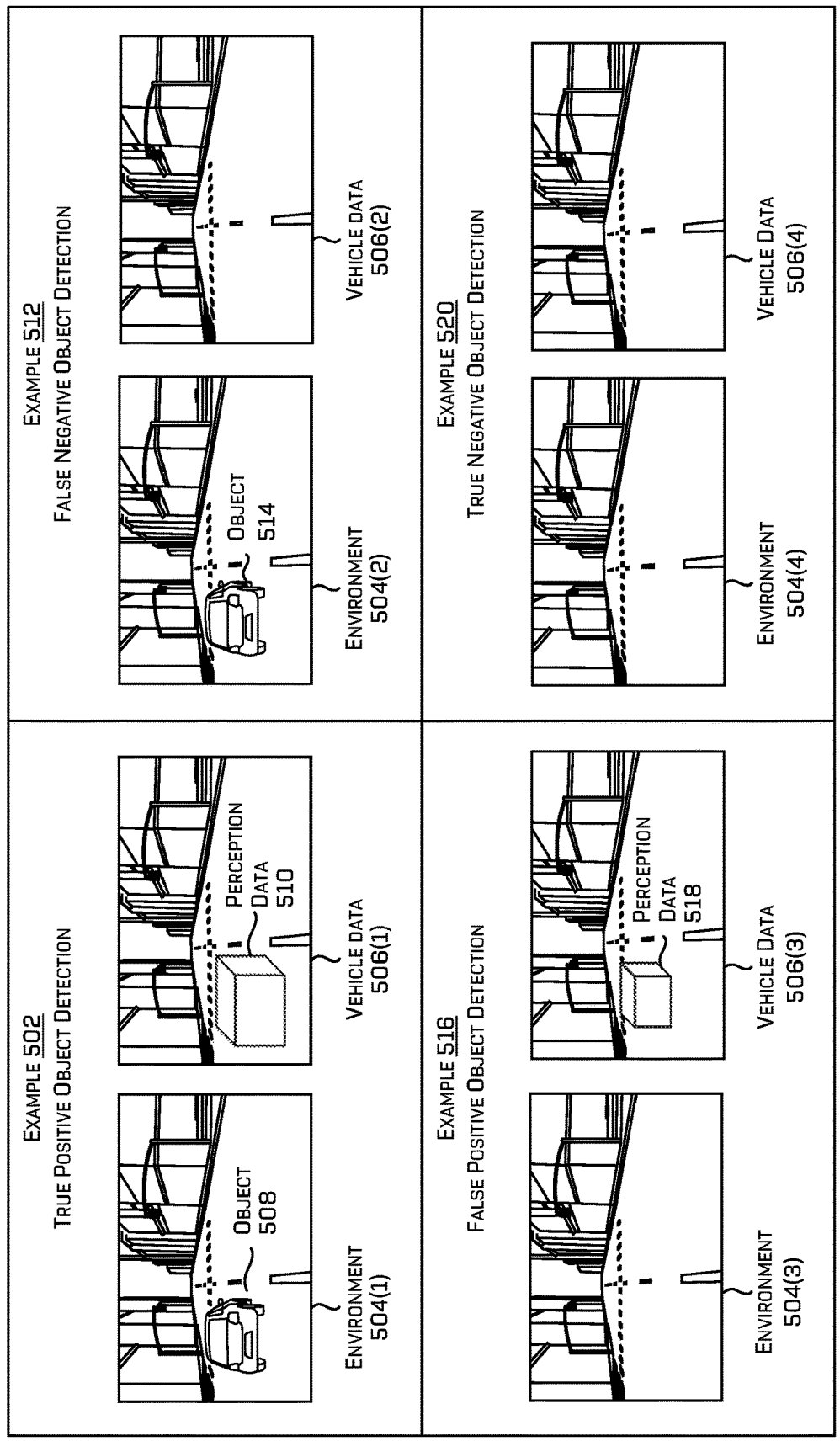
FIG. 5 illustrates four examples of a driving environment and corresponding vehicle data, in accordance with one or more examples of the disclosure.

FIG. 5 illustrates examples 500 of a driving environment associated with an autonomous vehicle, including corresponding vehicle data (e.g., perception data) determined by the autonomous vehicle based on sensor data representing the environment. In particular, the examples 500 illustrate the differences between the vehicle data and the driving environment with respect to the object detection capabilities of the autonomous vehicle. In general, the examples 500 illustrates a matrix of situations: true positive object detections, false negative object detections, false positive object detections, and true negative object detections, each discussed below and throughout this disclosure. Each of the examples 500 can occur any number of times during the normal course of operating an autonomous vehicle, including in real-world driving environments and/or in simulations. Both types of object detection errors (e.g., false positives and false negatives) and accurate object detections (e.g., true positives and true negatives) may occur in simulations, when either perturbed or unperturbed sensor data is used. Both types of object detection errors and accurate object detections also may occur within ground truth log data. However, as described herein, mimicking certain sensor faults by perturbing sensor data may cause an increased number of object detection errors to occur in some driving scenarios. Thus, object detection performance metrics and degradations may be determined by comparing the numbers or ratios of object detection errors and accurate object detections, between the sets of simulations using perturbed and unperturbed data.

Example 502 illustrates a first driving environment 504(1) and corresponding vehicle data 506(1) that is determined by an autonomous vehicle (e.g., a real or simulated vehicle) based on the environment 504(1). As illustrated in example 502, the environment 504(1) can include an object 508, and the vehicle data 506(1) can include perception data 510 representing the object 508 as perceived by the vehicle in the environment 504(1). This example is labeled as a true positive object detection because the vehicle data 506(1) includes perception data 510 corresponding to the object 508.

While example 502 can be treated as a true positive in this simplified scenario, the perception data 510 can misrepresent various attribute value(s) associated with the object 508, such as the object position, classification, size, shape, yaw, orientation, velocity, etc. of the associated object 508. In other examples, the constraint generator 102 may compare any or all of the attributes of the object 508 to the attributes of the corresponding perception data 510, to determine one or more performance degradation metrics for this true positive object detection. Additionally, although this example relates to the object detection functionality of a vehicle, in other examples similar analyses may be performed to evaluate any other autonomous vehicle functionalities, such as object segmentation, object classification, object tracking, object trajectory prediction, route-planning, etc.

Example 512 illustrates a second driving environment 504(2) and corresponding vehicle data 506(2) that is determined by an autonomous vehicle based on the environment 504(2). As illustrated in example 512, the environment 504(2) can include an object 514, and the vehicle data 506(2) indicates that no corresponding object has been perceived by the vehicle. This example is labeled as a false negative object detection because the vehicle data 506(2) fails to include perception data corresponding to the object 514.

Example 516 illustrates a third driving environment 504 (3) and corresponding vehicle data 506(3) that is determined by an autonomous vehicle based on the environment 504(3). As illustrated in example 516, the environment 504(3) does not include a vehicle object, but the vehicle data 506(3) includes perception data 518 indicating that an object has been perceived by the vehicle. This example is labeled as a false positive object detection because the vehicle data 506(3) includes perception data corresponding to an object that is not present in the environment 504(3).

Example 520 illustrates a fourth driving environment 504(4) and corresponding vehicle data 506(4) that is determined by an autonomous vehicle based on the environment 504(4). As illustrated in example 520, the environment 504(4) does not include a vehicle object, and the vehicle data 506(4) does not perception data indicating that an object has been perceived by the vehicle. This example is labeled as a true negative object detection because the vehicle data 506(4) does not include perception data corresponding to an object, and no object is present in the environment 504(4).

To determine object detection performance metrics associated with a vehicle (e.g., either the baseline performance or performance associated with a sensor fault), the constraint generator 102 may execute any number of different simulations (e.g., using perturbed and unperturbed sensor data) represent different driving scenarios, autonomous vehicle functionalities, etc. Additionally, with respect to any of the above errors or accurate object detections, the constraint generator 102 may condition an error model based on factors such as object type, distance, amount of occlusion, environment factors, and the like.

As discussed above, modeling the performance degradations caused by sensor faults may include generating error models that include distributions corresponding to the examples 502, 504, 506, and 508, for various different conditions, environments, and autonomous vehicle functionalities. By way of example and without limitation, the performance degradation component 112 can generate separate error models based at least in part on the distance between the simulated vehicle controller and a simulated object, and/or any additional environmental parameters as discussed herein. For example, when a simulated object is represented as 5 meters away from the simulated vehicle controller at a first time, the performance degradation component 112 can determine an error model representative of errors encountered at such a distance, when a sensor fault is mimicked (or injected) into the sensor data.

Additionally or alternatively, the performance degradation component 112 can generate separate error models based at least in part on the duration of a mimicked sensor fault. For example, when short-term sensor fault (e.g., 1 sec) is injected into the log data for one or more sensors, the performance degradation component 112 can determine an error model representative of errors encountered for such short-term sensor faults.

In some instances, an error distribution of the error model generated by the performance degradation component 112 can be based, at least in part, on the elapsed simulation time. By way of example and without limitation, a simulated vehicle controller can perceive a simulated object at a first time and perceive the simulated object at a second time. The error model can indicate that a probability of an error associated with the perception of the simulated object at the first time can be higher than the probability of an error associated with the perception of the simulated object at the second time. In some examples, the first time can represent a time in which a simulated vehicle controller first detects a simulated object. That is, an error model may vary based at least in part on a duration associated with a simulated object being tracked by the simulated vehicle controller.

Figure 6B:
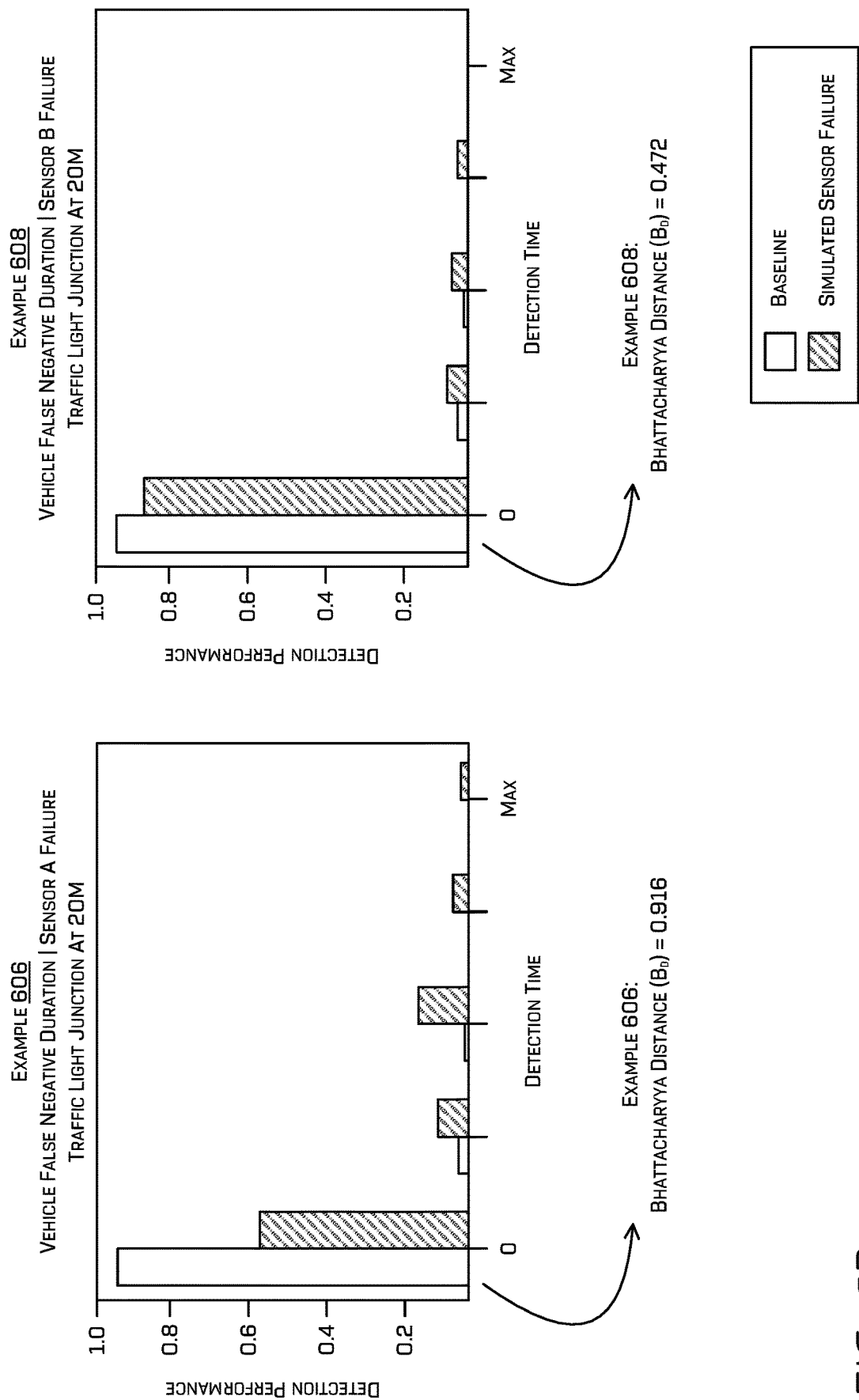

FIGS. 6A and 6B illustrate various examples of performance metrics that may be generated and evaluated by the performance degradation component 112, to determine the effect of an injected sensor fault on certain autonomous driving functionalities of a vehicle.

In FIG. 6A, two examples are depicted showing the performance degradation caused by two different sensor faults, when detecting pedestrians in a driving environment. Example 602 includes performance data (e.g., detection probability) based on a sensor fault associated with a first lidar sensor (e.g., Lidar Sensor A) on a vehicle 104, and example 604 includes corresponding performance data based on a sensor fault associated with a second lidar sensor (e.g., Lidar Sensor B). For each of these examples, a graph is shown including data representing the probability of successful pedestrian detections by the vehicle control systems, relative to the distance of the pedestrian from the vehicle. Each graph includes a baseline probability of pedestrian detection without any sensor fault injected, a first degraded probability caused by a one-second sensor failure injected into the sensor data for the lidar sensor, and a second degraded probability caused by a permanent (e.g., maximum length) sensor failure injected into the sensor data for the lidar sensor.

Based on the data shown in example 602, the performance degradation component 112 may determine that there is no significant degradation in the detection of pedestrians when a one-second sensor fault occurs for Lidar Sensor A. However, when a longer sensor fault occurs for Lidar Sensor A, a significant degradation in pedestrian detection does occur, and thus a constraint should be generated for maximum duration faults. In contrast, based on the data shown in example 604, the performance degradation component 112 may determine that there is no significant degradation in the detection of pedestrians when a sensor fault of any length occurs for Lidar Sensor B. Thus, no constraint may be needed for sensor faults of Lidar Sensor B, based on pedestrian detection performance (although constraints may be needed based on other performance degradations).

In FIG. 6B, two additional examples are depicted showing the performance degradation caused by two different sensor faults, when detecting vehicles at a traffic light junction from a distance of 20 meters. Examples 606 and 608 in FIG. 4B are depicted as histograms, showing the probability of detecting a vehicle at a traffic light junction from 20 meters away, relative to the detection time. Based on the data in example 606, the performance degradation component 112 may determine that a failure of Sensor A may cause a significant degradation in the time taken to detect a vehicle in this driving scenario. In contrast, based on the data in example 608, the performance degradation component 112 may determine that a failure of Sensor B does not cause a significant degradation in the time taken to detect a vehicle in this scenario. As shown in these examples, the performance degradation component 112 also may compute the Bhattacharyya distance for each histogram, to determine a metric representing the performance degradation caused by the sensor failure. In some instances, the Bhattacharyya distances representing the performance degradation caused by a sensor fault, for any number of autonomous driving functionalities and scenarios, may be compared to a performance degradation threshold to determine whether or not a constraint is needed for the sensor fault.

FIG. 7 illustrates an example table 700 including a set of constraints, along with the corresponding sensor faults and other associated conditions. The set of example constraints in table 700 may correspond to the constraints 116 determined by a constraint generator 102 using the techniques described herein, and provided to one or more vehicles 118. As discussed above, such constraints may be stored on the vehicles 118 (e.g., vehicle 202) and applied by a fault monitor 226 based on various fault indications received during operation of the vehicle 202.

Constraint 702 represents a first example constraint to be applied by a vehicle 202 in response to a sensor fault (e.g., an outage) of a particular lidar sensor (e.g., the Lidar_A4 sensor) lasting two or more seconds. Additionally, as shown in this example, the vehicle 202 might apply constraint 702 only in night driving environments. The constraint 702, when applied, includes a restriction on the vehicle 202 limiting the maximum speed to 25 MPH.

Constraint 704 represents a second example constraint to be applied by a vehicle 202 in response to a combination of sensor faults including a degradation of a particular lidar sensor (e.g., the Lidar_A2 sensor) and an outage of a particular radar sensor covering the same region of the environment, lasting any duration of time. In this example, the vehicle 202 may apply constraint 704 only in adverse driving conditions (e.g., rain, fog, or snow), and when the constraint 704 is applied, the constraint may cause the vehicle to perform a third contingent trajectory (e.g., a trajectory requiring the vehicle 202 to pull over within a predetermined amount of time or distance).

Constraint 706 represents a third example constraint to be applied by a vehicle 202 in response to a sensor fault indicating a partial occlusion of a particular front camera of the vehicle, lasting at least one second. In this example, the vehicle 202 may apply constraint 706 in any driving conditions, and when the constraint 706 is applied, the constraint may restrict the maximum steering angle that can be used by the vehicle to perform driving maneuvers.

Constraint 708 represents a fourth example constraint to be applied by a vehicle 202 in response to a sensor fault indicating a minor decrease in tire pressure on any of the tires of the vehicle 202, lasting at least one minute. In this example, the vehicle 202 may apply constraint 708 in any driving conditions, and when the constraint 708 is applied, the constraint may cause no immediate limitations on the driving behaviors of the vehicle, but may cause the vehicle to return for maintenance between accepting a new trip or missions.

Constraint 710 represents a fifth example constraint to be applied by a vehicle 202 in response to a sensor fault indicating a larger decrease in tire pressure on any of the tires of the vehicle 202, lasting at least ten seconds. In this example, the vehicle 202 may apply constraint 710 in any driving conditions, and when the constraint 710 is applied, the constraint may cause the vehicle to perform a second contingent trajectory (e.g., a trajectory requiring the vehicle 202 to pull over within a different predetermined amount of time or distance).

Figure 8:
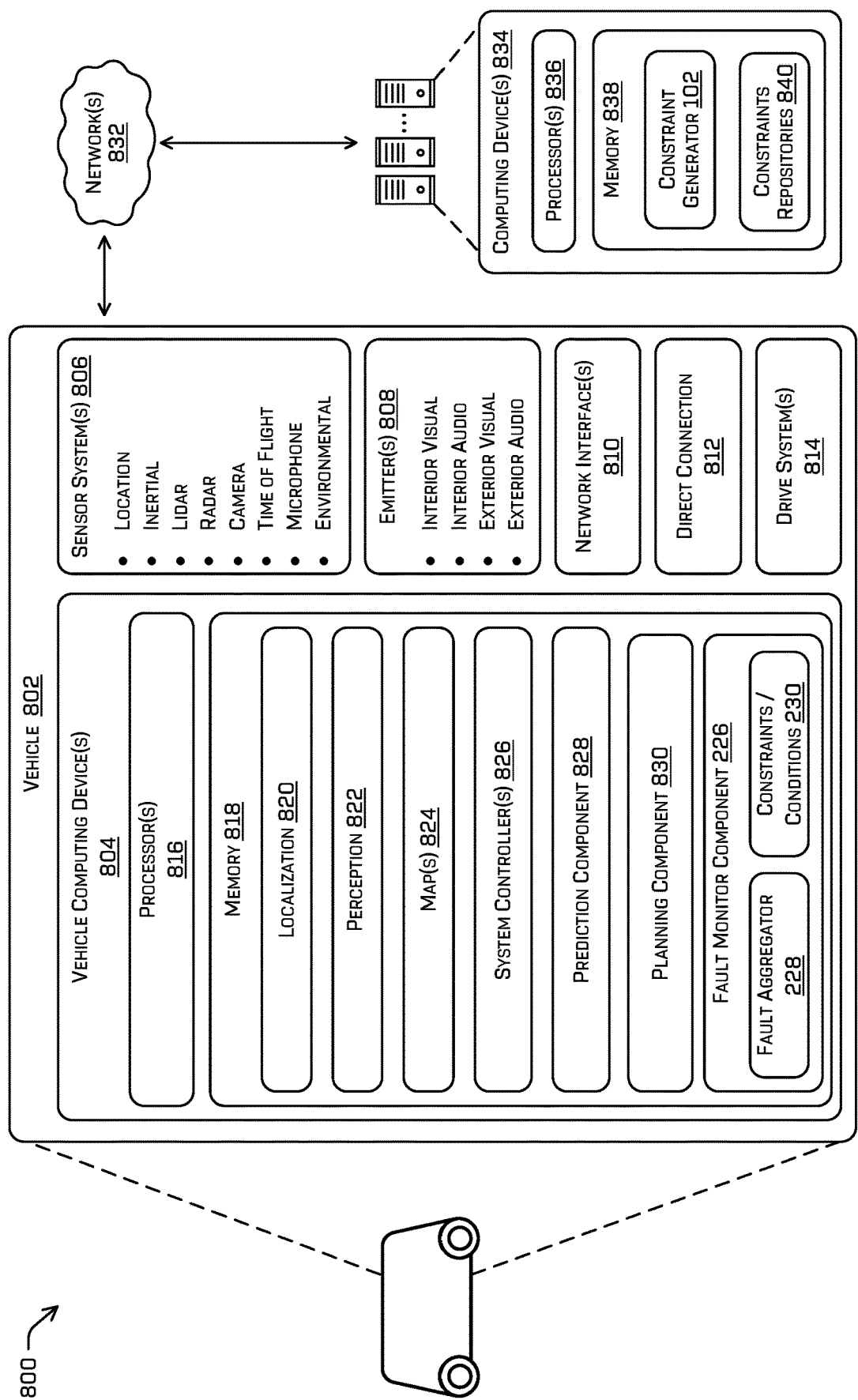
FIG. 8 is a block diagram illustrating an example system, including an autonomous vehicle and separate computing devices, for implementing various techniques described herein.

FIG. 8 is a block diagram of an example system 800 for implementing the techniques described herein. In at least one example, the system 800 may include a vehicle, such as vehicle 802. The vehicle 802 may include one or more vehicle computing devices 804, one or more sensor systems 806, one or more emitters 808, one or more network interfaces 810, at least one direct connection 812, and one or more drive systems 814.

The vehicle computing device 804 may include one or more processors 816 and memory 818 communicatively coupled with the processor(s) 816. In the illustrated example, the vehicle 802 is an autonomous vehicle; however, the vehicle 802 could be any other type of vehicle, such as a semi-autonomous vehicle, or any other system having driving trajectory planning/navigation functionality. For example, the vehicle 802 may be similar or identical to the vehicle 202 described above. In some instances, the autonomous vehicle 802 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 802 may be a fully or partially autonomous vehicle having any other level or classification.

In the illustrated example, the memory 818 of the vehicle computing device 804 stores a localization component 820, a perception component 822, one or more maps 824 (or map data), one or more system controllers 826, a prediction component 828, a planning component 830, and a fault monitor component 226 including a fault aggregator 228 and a constraints and conditions component 230. Though depicted in FIG. 8 as residing in the memory 818 for illustrative purposes, it is contemplated that the localization component 820, the perception component 822, the maps 824, the system controllers 826, the prediction component 828, the planning component 830, the fault monitor component 226, the fault aggregator 228, and/or the constraints and conditions component 230 may additionally, or alternatively, be accessible to the vehicle 802 (e.g., stored on, or otherwise accessible by, memory remote from the vehicle 802, such as, for example, memory 838 of one or more computing device(s) 834). In some examples, the memory 838 may include one or more constraint generators 102 and/or constraint repositories 840 storing sets of constraints associated with various vehicle types, models, and/or driving conditions.

In at least one example, the localization component 820 may include functionality to receive sensor data from the sensor system(s) 806 to determine a position and/or orientation of the vehicle 802 (e.g., one or more of an x-, y-, z-position, roll, pitch, or yaw). For example, the localization component 820 may include and/or request/receive a map of an environment, such as from map(s) 824, and may continuously determine a location and/or orientation of the vehicle 802 within the environment. In some instances, the localization component 820 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 802. In some instances, the localization component 820 may provide data to various components of the vehicle 802 to determine an initial position of the vehicle 802 for determining the relevance of an object to the vehicle 802, as discussed herein.

In some instances, the perception component 822 may include functionality to perform object detection, segmentation, and/or classification. In some examples, the perception component 822 may provide processed sensor data that indicates a presence of an object (e.g., entity) that is proximate to the vehicle 802 and/or a classification of the object as an object type (e.g., car, pedestrian, cyclist, animal, building, tree, road surface, curb, sidewalk, unknown, etc.). In some examples, the perception component 822 may provide processed sensor data that indicates a presence of a stationary entity that is proximate to the vehicle 802 and/or a classification of the stationary entity as a type (e.g., building, tree, road surface, curb, sidewalk, unknown, etc.). In additional or alternative examples, the perception component 822 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The memory 818 may further include one or more maps 824 that may be used by the vehicle 802 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 802 may be controlled based at least in part on the map(s) 824. That is, the map(s) 824 may be used in connection with the localization component 820, the perception component 822, the prediction component 828, and/or the planning component 830 to determine a location of the vehicle 802, detect objects in an environment, generate routes, determine actions and/or trajectories to navigate within an environment.

In some examples, the one or more maps 824 may be stored on a remote computing device(s) (such as the computing device(s) 834) accessible via network(s) 832. In some examples, multiple maps 824 may be stored based on, for example, a characteristic (e.g., type of entity, time of day, day of week, season of the year, etc.). Storing multiple maps 824 may have similar memory requirements, but increase the speed at which data in a map may be accessed.

In at least one example, the vehicle computing device 804 may include one or more system controllers 826, which may be configured to control steering, propulsion, braking, safety, emitters, communication, and other systems of the vehicle 802. The system controller(s) 826 may communicate with and/or control corresponding systems of the drive system(s) 814 and/or other components of the vehicle 802.

The prediction component 828 may generate one or more probability maps representing prediction probabilities of possible locations of one or more objects in an environment. For example, the prediction component 828 may generate one or more probability maps for vehicles, pedestrians, animals, and the like within a threshold distance from the vehicle 802. In some instances, the prediction component 828 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 828 may generate predicted trajectories of objects in an environment. For example, the prediction component 828 may generate one or more predicted trajectories for objects within a threshold distance from the vehicle 802. In some examples, the prediction component 828 may measure a trace of an object and generate a trajectory for the object based on observed and predicted behavior.

The planning component 830 may include various components configured to determine a trajectory for the vehicle 802 to follow to traverse through an environment. In various examples, the planning component 830 may determine various routes and trajectories and various levels of detail. For example, the planning component 830 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 830 may generate an instruction for guiding the vehicle 802 along at least a portion of the route from the first location to the second location. In at least one example, the planning component 830 may determine how to guide the vehicle 802 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single trajectory of the multiple trajectories in a receding data horizon having the highest confidence level may be selected to operate the vehicle. In various examples, the planning component 830 may select a trajectory for the vehicle 802.

In other examples, the planning component 830 may alternatively, or additionally, use data from the localization component 820, the perception component 822, map(s) 824, and/or the prediction component 828 to determine a trajectory for the vehicle 802 to follow to traverse through an environment. For example, the planning component 830 may receive data (e.g., object data) from the localization component 820, the perception component 822, and/or the prediction component 828 regarding objects associated with an environment. In some examples, the planning component 830 receives data for relevant objects within the environment. Using this data, the planning component 830 may determine a route to travel from a first location (e.g., a current location) to a second location (e.g., a target location) to avoid objects in an environment. In at least some examples, such a planning component 830 may determine there is no such collision-free trajectory and, in turn, provide a trajectory that brings vehicle 802 to a safe stop avoiding all collisions and/or otherwise mitigating damage.

In some instances, aspects of some or all of the components discussed herein may include any models, techniques, and/or machine learned techniques. For example, in some instances, the components in the memory 818 (and the memory 838, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 806 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 806 may include multiple instances of each of these or other types of sensors. For instance, the lidar sensors may include individual lidar sensors located at the corners, front, back, sides, and/or top of the vehicle 802. As another example, the camera sensors may include multiple cameras disposed at various locations about the exterior and/or interior of the vehicle 802. The sensor system(s) 806 may provide input to the vehicle computing device 804. Additionally, or in the alternative, the sensor system(s) 806 may send sensor data, via the one or more networks 832, to the one or more computing device(s) 834 at a particular frequency, after a lapse of a predetermined period of time, in near real-time, etc.

The vehicle 802 may also include one or more emitters 808 for emitting light and/or sound. The emitter(s) 808 may include interior audio and visual emitters to communicate with passengers of the vehicle 802. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 808 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 802 may also include one or more network interfaces 810 (or communication connections) that enable communication between the vehicle 802 and one or more other local or remote computing device(s). For instance, the network interfaces 810 may facilitate communication with other local computing device(s) on the vehicle 802 and/or the drive system(s) 814. Also, the network interface(s) 810 may allow the vehicle to communicate with other nearby computing device(s) (e.g., computing device(s) 834, other nearby vehicles, etc.) and/or one or more remote sensor system(s) for receiving sensor data. The network interface(s) 810 also may enable the vehicle 802 to communicate with a remote teleoperations computing device or other remote services.

The network interface(s) 810 may include physical and/or logical interfaces for connecting the vehicle computing device 804 to another computing device or a network, such as network(s) 832. For example, the network interface(s) 810 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 802 may include one or more drive systems 814. In some examples, the vehicle 802 may have a single drive system 814. In at least one example, if the vehicle 802 has multiple drive systems 814, individual drive systems 814 may be positioned on opposite ends of the vehicle 802 (e.g., the front and the rear, etc.). In at least one example, the drive system(s) 814 may include one or more sensor systems to detect conditions of the drive system(s) 814 and/or the surroundings of the vehicle 802. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 814. In some cases, the sensor system(s) on the drive system(s) 814 may overlap or supplement corresponding systems of the vehicle 802 (e.g., sensor system(s) 806).

The drive system(s) 814 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 814. Furthermore, the drive system(s) 814 may also include one or more communication connection(s) that enable communication by the respective drive module with one or more other local or remote computing device(s).

In at least one example, the direct connection 812 may provide a physical interface to couple the one or more drive system(s) 814 with the body of the vehicle 802. For example, the direct connection 812 may allow the transfer of energy, fluids, air, data, etc. between the drive system(s) 814 and the vehicle. In some instances, the direct connection 812 may further releasably secure the drive system(s) 814 to the body of the vehicle 802.

In at least one example, the localization component 820, the perception component 822, the maps 824, the system controllers 826, the prediction component 828, the planning component 830, the fault monitor component 226, the fault aggregator 228, and/or the constraints and conditions component 230 may process sensor data, as described above, and may send their respective outputs, over the one or more network(s) 832, to the computing device(s) 834. In at least one example, the localization component 820, the perception component 822, the maps 824, the system controllers 826, the prediction component 828, the planning component 830, the fault monitor component 226, the fault aggregator 228, and/or the constraints and conditions component 230 may send their respective outputs to the computing device(s) 834 at a particular frequency, after a lapse of a predetermined period of time, in near real-time, etc.

In some examples, the vehicle 802 may send sensor data to the computing device(s) 834 via the network(s) 832. In some examples, the vehicle 802 may receive sensor data from the computing device(s) 834 and/or remote sensor system(s) via the network(s) 832. The sensor data may include raw sensor data and/or processed sensor data and/or representations of sensor data. In some examples, the sensor data (raw or processed) may be sent and/or received as one or more log files.

The computing device(s) 834 may include processor(s) 836 and a memory 838, which may include one or more constraint generator(s) 102, which may be similar or identical to the constraint generator 102 discussed above in reference to FIGS. 1-7. The memory 838 also may include one or more constraint repositories 840 storing sets of constraints associated with various vehicles. For instance, the constraint repositories 840 may include sets of constraints 116 separately determined by the constraint generator 102 for any number different vehicle types, models, and/or combinations of driving conditions. In such examples, the computing device(s) 834 may be configured to provide various sets of the constraints to various different vehicles (e.g., 802), depending on the type, model, features, current driving environment, current driving conditions, etc., of the vehicles. Additionally, in some examples, the memory 838 may store one or more of components that are similar to the component(s) stored in the memory 818 of the vehicle 802. In such examples, the computing device(s) 834 may be configured to perform one or more of the processes described herein with respect to the vehicle 802.

The processor(s) 816 of the vehicle 802 and the processor(s) 836 of the computing device(s) 834 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 818 and memory 838 are examples of non-transitory computer-readable media. The memory 818 and memory 838 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 8 is illustrated as a distributed system, in alternative examples, components of the vehicle 802 may be associated with the computing device(s) 834 and/or components of the computing device(s) 834 may be associated with the vehicle 802. That is, the vehicle 802 may perform one or more of the functions associated with the computing device(s) 834, and vice versa.

Figure 9:
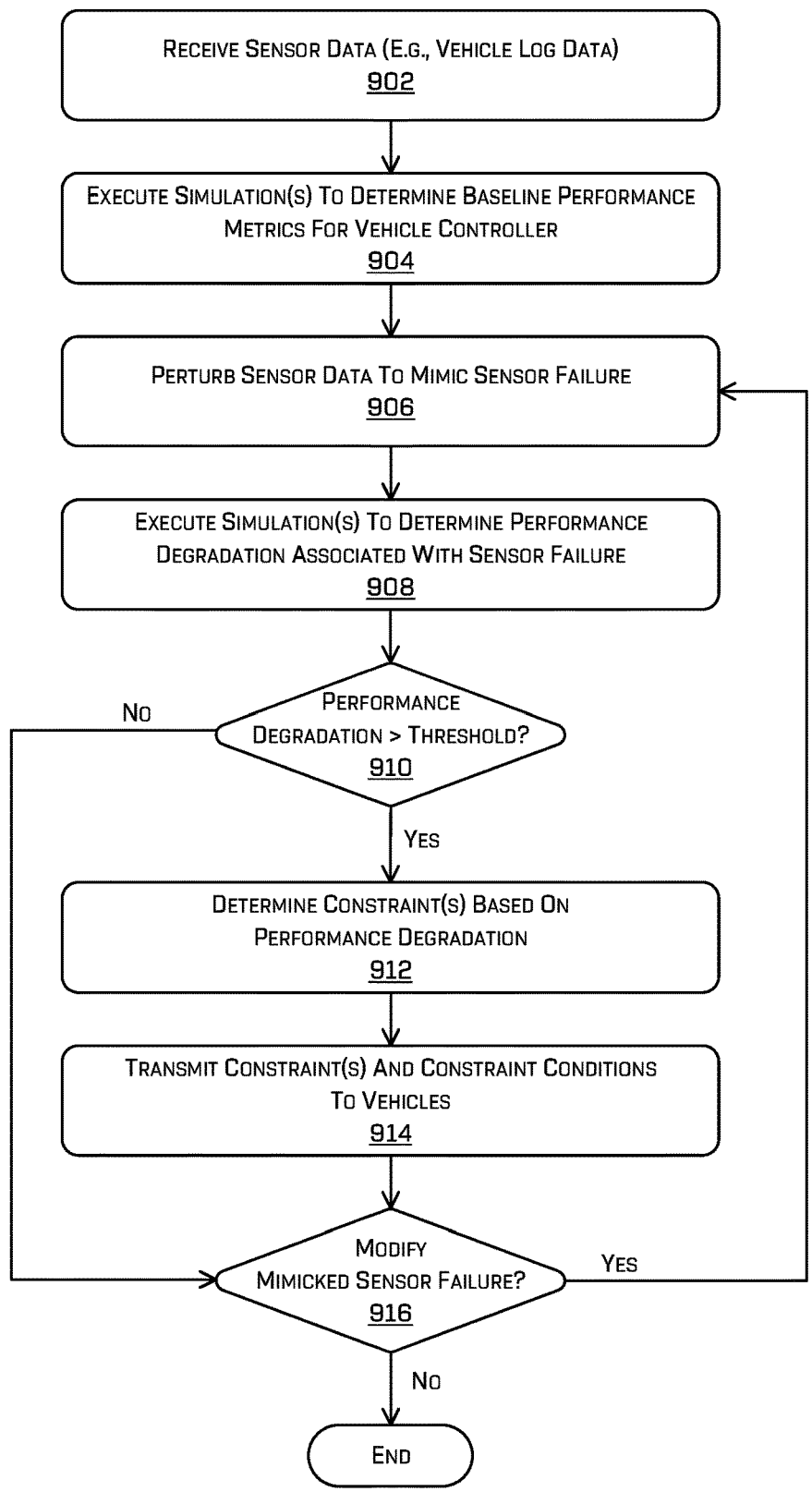
FIG. 9 is a flow diagram illustrating an example technique for determining constraints associated with sensor faults, in accordance with one or more examples of the disclosure.

FIG. 9 depicts an example process 900 of determining a constraint that may be applied in response detection of a sensor fault on a vehicle. As described herein, the operations in process 900 may be performed by a constraint generator component (e.g., constraint generator 102), and the resulting constraints may be provided to one or more vehicles (e.g., vehicle 202) to be applied by a fault monitor component 226.

At operation 902, the constraint generator 102 may receive sensor data. In some examples, the received sensor data may be integrated into and/or otherwise associated with log data 106, representing a driving scenario traversed by a vehicle 104 in an environment. The vehicle 104 from which the sensor data is captured (and/or generated using post-processing operations) may include any number of sensors of various different modalities (e.g., lidar sensors, radar sensors, cameras, etc.).

At operation 904, the constraint generator 102 may execute one or more simulations based on the received sensor data. In some examples, the constraint generator 102 may use a simulation component 110 to perform log-based simulations based on received log data. During the simulations, the simulation component 110 may determine baseline performance metrics associated with the vehicle control systems used to control the simulated vehicles. As described above, any number of simulations may be executed in operation 904, including simulations based on multiple different log data and/or driving scenarios. Based on the simulations executed in operation 904, the constraint generator 102 may determine and/or evaluate multiple different autonomous driving functionalities (e.g., object detection, object classification, object segmentation, object tracking, trajectory prediction, etc.), including the performance of such functionalities for various object types, at various distances from the simulated vehicle, and/or in various driving environments/conditions, etc.

At operation 906, the constraint generator 102 may perturb the sensor data received in operation 902 to represent (or mimic) one or more sensor faults. As described above, perturbing the sensor data in operation 906 may include removing and/or modifying portions (or all) of the sensor data corresponding to particular sensor(s), while leaving the sensor data corresponding to other sensors unperturbed. Various different sensor data perturbations may be used to represent (or mimic) any number of different sensor fault types (e.g., outages, errors, occlusions, or other anomalies). Additionally, perturbing the sensor data in operation 906 may include perturbing (e.g., modifying or removing) portions of the sensor data corresponding to time intervals, so that short-term or intermittent sensor faults can be mimicked.

At operation 908, the constraint generator 102 may execute another set of simulations, corresponding to the simulations executed in operation 904, using the perturbed sensor data. Based on these additional simulations performed using the perturbed sensor data, the constraint generator 102 may determine additional performance metrics that may (or may not) include performance degradations relative to the baseline performance metrics determined in operation 904. As described above, potential performance degradations caused by the mimicked sensor fault may include performance degradations relating to any autonomous driving functionality (e.g., object detection, classification, tracking, etc.), and different levels of performance degradations may be determined for different autonomous driving functionalities as well as different distances, object types, sensor fault durations, and/or driving conditions, etc. For instance, the results of the set of simulations using the perturbed sensor data to inject a sensor fault, may be determined relative to the baseline performance metrics determined in operation 904.

At operation 910, the constraint generator 102 may determine whether the performance degradations caused by the injected sensor fault(s) meet or exceed a performance degradation threshold. In instances when the performance degradations caused by the sensor faults are non-existent or negligible, the constraint generator 102 may determine that no constraint is needed for the sensor faults (910: No), and process 900 may proceed to operation 916. However, when the constraint generator 102 determines that the performance degradations caused by the sensor faults are non-negligible (e.g., less than 90% of the baseline performance level, or outside the noise level of the baseline performance distribution, etc.), then at operation 912, the constraint generator 102 may determine one or more constraints to be applied on the vehicle 202 when the sensor faults are detected. As described herein, any number of constraints may be determined for the vehicle 202, based on the types and magnitudes of the performance degradations caused by the corresponding sensor faults. Constraints also may be associated with specific fault durations, driving scenarios, and/or environments, so that such constraints may be applied conditionally on the vehicle 202 in response to the combination of the aggregated sensor faults and other associated conditions. At operation 914, the constraint generator 102 may transmit the constraints determined in operation 912 to one or more vehicles 118, to be applied by the fault monitor systems of such vehicles.

At operation 916, the constraint generator 102 may optionally determine one or more modifications to the mimicked sensor failure. For instance, based on the degree of performance degradation determined in operation 908, and/or based on the constraints determined in operation 912 for a previously analyzed sensor fault, the constraint generator 102 may determine an additional sensor fault to analyze in operation 916. The additional sensor fault may be determined, for example, by modifying the particular faulty sensors, the fault duration, and/or the fault type associated with previously analyzed sensor faults. As an example, if only a negligible performance degradation was caused by a one-second sensor fault for a particular sensor, then in operation 916 the constraint generator 102 may determine that a longer duration sensor fault may be analyzed (916: Yes). As another example, if a significant performance degradation was caused by a sensor fault for a particular lidar sensor mounted at one location on the vehicle body, then in operation 916 the constraint generator 102 may determine that a sensor fault for a similar lidar sensor at a different location on the vehicle body may be analyzed (916: Yes).

Example Clauses

A. A system comprising: one or more processors; and one or more non-transitory computer-readable media storing computer-executable instructions that, when executed, cause the one or more processors to perform operations comprising: receive data associated with a vehicle operating in an environment, including sensor data associated with a sensor on the vehicle; determine, based at least in part on the data, a first metric associated with the vehicle operating in the environment; perturb, as perturbed sensor data, the sensor data; execute a driving simulation based at least in part on the perturbed sensor data; determine a second metric associated with operating a simulated vehicle in the driving simulation; determine, based at least in part on a difference between first metric and the second metric, a constraint comprising a limitation on a parameter associated with the operation of the vehicle; and transmitting the constraint to an autonomous vehicle configured to be controlled based at least in part on the constraint.

B. The system of paragraph A, wherein perturbing the sensor data comprises: determining a time interval, within a duration of time associated with the sensor data; and perturbing a first portion of the sensor data associated with the time interval, including one or more of: modifying the first portion of the sensor data, based at least in part on a sensor degradation profile, or removing the first portion of the sensor data from the sensor data.

C. The system of paragraph A, wherein the difference comprises a difference in a probability of detecting an object represented in the sensor data.

D. The system of paragraph A, wherein: the sensor data is first sensor data associated with a first sensor, perturbing the sensor data further includes perturbing second sensor data associated with a second sensor, and the constraint is associated with a concurrent fault of the first sensor and the second sensor.

E. The system of paragraph A, the operations further comprising: determining at least one of a driving scenario, a driving region, or a driving condition associated with the sensor data, wherein transmitting the constraint to the autonomous vehicle comprises transmitting: first data indicating the constraint, and second data indicating the at least one of the driving scenario, the driving region, or the driving condition.

F. A method comprising: receiving data associated with operation of a vehicle in an environment; determining, based at least in part on the data, a first metric associated with operating the vehicle in the environment; perturbing, as perturbed data, a portion of the data; executing a simulation based at least in part on the perturbed data; determining a second metric associated with operation of a simulated vehicle in the simulation; determining, based at least in part on the first metric and second metric, a constraint associated with operation of a component of the vehicle; and transmitting the constraint to a vehicle configured to be controlled based at least in part on the constraint.

G. The method of paragraph F, wherein perturbing the portion of the data comprises at least one of: modifying, based at least in part on a degradation profile, the portion of the data; or removing, from the data, the portion of the data.

H. The method of paragraph F, wherein: the portion of the data is a first portion associated with a first sensor, the data further includes a second portion associated with a second sensor, and the perturbed data comprises a perturbed first portion of the data and an unperturbed second portion of the data.

I. The method of paragraph F, further comprising: determining, as one or more of the first metric or the second metric, a probability of failing to detect an object, and wherein determining the constraint is based at least in part on the probability.

J. The method of paragraph F, wherein determining the first metric comprises: executing, based at least in part on the data, a second simulation; and determining the first metric associated with operating the vehicle in the environment, based at least in part on the second simulation.

K. The method of paragraph F, wherein the first metric comprises a first histogram, the second metric comprises a second histogram, and determining the constraint comprises determining a similarity value between the first histogram and the second histogram.

L. The method of paragraph F, wherein perturbing the portion of the data comprises: determining a first sensor on the vehicle, wherein the first sensor comprises at least one of: a lidar sensor, a radar sensor, a camera, a depth sensor, or a time-of-flight sensor; and perturbing the portion of the data associated with the first sensor.

M. The method of paragraph F, wherein the portion of the data is associated with a first sensor, perturbing the data further includes perturbing a second portion of the data associated with a second sensor, and the constraint is associated with a concurrent fault of the first sensor and the second sensor.

N. The method of paragraph F, further comprising: determining at least one of a driving scenario, a driving region, or a driving condition associated with the data, wherein transmitting the constraint to the vehicle comprises transmitting: first data indicating the constraint, and second data indicating the at least one of the driving scenario, the driving region, or the driving condition.

O. The method of paragraph F, wherein the constraint comprises at least one of: a trajectory constraint, a dynamic constraint, a power constraint, an allowed mission constraint, a pull-over constraint, or a release constraint.

P. One or more non transitory computer readable media storing instructions executable by a processor, wherein the instructions, when executed, cause the processor to perform operations comprising: receiving data associated with operation of a vehicle in an environment; determining, based at least in part on the data, a first metric associated with operating the vehicle in the environment; perturbing, as perturbed data, a portion of the data; executing a simulation based at least in part on the perturbed data; determining a second metric associated with operation of a simulated vehicle in the simulation; determining, based at least in part on the first metric and second metric, a constraint associated with operation of a component of the vehicle; and transmitting the constraint to a vehicle configured to be controlled based at least in part on the constraint.

Q. The one or more non transitory computer readable media of paragraph P, wherein determining the first metric comprises: executing, based at least in part on the data, a second simulation; and determining the first metric associated with operating the vehicle in the environment, based at least in part on the second simulation.

R. The one or more non transitory computer readable media of paragraph P, wherein the first metric comprises a first histogram, the second metric comprises a second histogram, and determining the constraint comprises determining a similarity value between the first histogram and the second histogram.

S. The one or more non transitory computer readable media of paragraph P, wherein: the portion of the data is a first portion associated with a first sensor, the data further includes a second portion associated with a second sensor, and the perturbed data comprises a perturbed first portion of the data and an unperturbed second portion of the data.

T. The one or more non transitory computer readable media of paragraph P, wherein the portion of the data is associated with a first sensor, perturbing the data further includes perturbing a second portion of the data associated with a second sensor, and the constraint is associated with a concurrent fault of the first sensor and the second sensor.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the one or more processors to perform operations comprising:
receive data associated with a vehicle operating in an environment, including sensor data associated with a sensor on the vehicle;
determine, based at least in part on the data, a first metric associated with the vehicle operating in the environment;
perturb, as perturbed sensor data, the sensor data;
execute a driving simulation based at least in part on the perturbed sensor data;
determine a second metric associated with operating a simulated vehicle in the driving simulation;
determine, based at least in part on a difference between first metric and the second metric, a constraint comprising a limitation on a parameter associated with the operation of the vehicle; and
transmitting the constraint to an autonomous vehicle configured to be controlled based at least in part on the constraint.

2. The system of claim 1, wherein perturbing the sensor data comprises:
determining a time interval, within a duration of time associated with the sensor data; and
perturbing a first portion of the sensor data associated with the time interval, including one or more of:
modifying the first portion of the sensor data, based at least in part on a sensor degradation profile, or
removing the first portion of the sensor data from the sensor data.

3. The system of claim 1, wherein the difference comprises a difference in a probability of detecting an object represented in the sensor data.

4. The system of claim 1, wherein:
the sensor data is first sensor data associated with a first sensor,
perturbing the sensor data further includes perturbing second sensor data associated with a second sensor, and
the constraint is associated with a concurrent fault of the first sensor and the second sensor.

5. The system of claim 1, the operations further comprising:
determining at least one of a driving scenario, a driving region, or a driving condition associated with the sensor data, wherein transmitting the constraint to the autonomous vehicle comprises transmitting:
   first data indicating the constraint, and
   second data indicating the at least one of the driving scenario, the driving region, or the driving condition.

6. A method comprising:
   receiving data associated with operation of a vehicle in an environment;
   determining, based at least in part on the data, a first metric associated with operating the vehicle in the environment;
   perturbing, as perturbed data, a portion of the data;
   executing a simulation based at least in part on the perturbed data;
   determining a second metric associated with operation of a simulated vehicle in the simulation;
   determining, based at least in part on the first metric and second metric, a constraint associated with operation of a component of the vehicle; and
   transmitting the constraint to a vehicle configured to be controlled based at least in part on the constraint.

7. The method of claim 6, wherein perturbing the portion of the data comprises at least one of:
   modifying, based at least in part on a degradation profile, the portion of the data; or
   removing, from the data, the portion of the data.

8. The method of claim 6, wherein:
   the portion of the data is a first portion associated with a first sensor,
   the data further includes a second portion associated with a second sensor, and
   the perturbed data comprises a perturbed first portion of the data and an unperturbed second portion of the data.

9. The method of claim 6, further comprising:
   determining, as one or more of the first metric or the second metric, a probability of failing to detect an object, and
   wherein determining the constraint is based at least in part on the probability.

10. The method of claim 6, wherein determining the first metric comprises:
    executing, based at least in part on the data, a second simulation; and
    determining the first metric associated with operating the vehicle in the environment, based at least in part on the second simulation.

11. The method of claim 6, wherein
    the first metric comprises a first histogram,
    the second metric comprises a second histogram, and
    determining the constraint comprises determining a similarity value between the first histogram and the second histogram.

12. The method of claim 6, wherein perturbing the portion of the data comprises:
    determining a first sensor on the vehicle, wherein the first sensor comprises at least one of:
       a lidar sensor,
       a radar sensor,
       a camera,
       a depth sensor, or
       a time-of-flight sensor; and
    perturbing the portion of the data associated with the first sensor.

13. The method of claim 6, wherein
    the portion of the data is associated with a first sensor,
    perturbing the data further includes perturbing a second portion of the data associated with a second sensor, and
    the constraint is associated with a concurrent fault of the first sensor and the second sensor.

14. The method of claim 6, further comprising:
    determining at least one of a driving scenario, a driving region, or a driving condition associated with the data,
    wherein transmitting the constraint to the vehicle comprises transmitting:
       first data indicating the constraint, and
       second data indicating the at least one of the driving scenario, the driving region, or the driving condition.

15. The method of claim 6, wherein the constraint comprises at least one of:
    a trajectory constraint,
    a dynamic constraint,
    a power constraint,
    an allowed mission constraint,
    a pull-over constraint, or
    a release constraint.

16. One or more non-transitory computer-readable media storing instructions executable by a processor, wherein the instructions, when executed, cause the processor to perform operations comprising:
    receiving data associated with operation of a vehicle in an environment;
    determining, based at least in part on the data, a first metric associated with operating the vehicle in the environment;
    perturbing, as perturbed data, a portion of the data;
    executing a simulation based at least in part on the perturbed data;
    determining a second metric associated with operation of a simulated vehicle in the simulation;
    determining, based at least in part on the first metric and second metric, a constraint associated with operation of a component of the vehicle; and
    transmitting the constraint to a vehicle configured to be controlled based at least in part on the constraint.

17. The one or more non-transitory computer-readable media of claim 16, wherein determining the first metric comprises:
    executing, based at least in part on the data, a second simulation; and
    determining the first metric associated with operating the vehicle in the environment, based at least in part on the second simulation.

18. The one or more non-transitory computer-readable media of claim 16, wherein
    the first metric comprises a first histogram,
    the second metric comprises a second histogram, and
    determining the constraint comprises determining a similarity value between the first histogram and the second histogram.

19. The one or more non-transitory computer-readable media of claim 16, wherein:
    the portion of the data is a first portion associated with a first sensor,
    the data further includes a second portion associated with a second sensor, and
    the perturbed data comprises a perturbed first portion of the data and an unperturbed second portion of the data.

20. The one or more non-transitory computer-readable media of claim 16, wherein
    the portion of the data is associated with a first sensor,
    perturbing the data further includes perturbing a second portion of the data associated with a second sensor, and the constraint is associated with a concurrent fault of the first sensor and the second sensor.

* * * * *